(12) United States Patent
Ito et al.

(10) Patent No.: US 6,384,968 B1
(45) Date of Patent: May 7, 2002

(54) MICROSCOPE WITH ILLUMINATING OPTICAL SYSTEM

(75) Inventors: Eiichi Ito; Daisuke Koreeda, both of Tokyo; Satoru Tachihara, Saitama-ken, all of (JP)

(73) Assignee: Asahi Kogaku Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/585,646

(22) Filed: Jun. 1, 2000

(30) Foreign Application Priority Data

May 31, 1999 (JP) .......................................... 11-150836
Oct. 15, 1999 (JP) .......................................... 11-294347

(51) Int. Cl.$^7$ .......................... G02B 21/06; G02B 23/16
(52) U.S. Cl. ........................ 359/389; 359/385; 359/614
(58) Field of Search ................................. 359/614, 601, 359/389, 385, 390, 380, 379, 377, 376

(56) References Cited

U.S. PATENT DOCUMENTS 3,951,522 A * 4/1976 Hashimoto .................. 359/601
4,341,435 A * 7/1982 Lang et al. .................. 359/385
4,511,223 A * 4/1985 Hirose ......................... 359/385
4,657,357 A * 4/1987 Nishimura et al. ......... 359/377
4,793,700 A * 12/1988 Takagi et al. ............... 359/381
5,825,532 A   10/1998 Mochizuki et al.

* cited by examiner

Primary Examiner—Jon Henry
(74) Attorney, Agent, or Firm—Pitney, Hardin, Kipp & Szuch LLP

(57) ABSTRACT

The optical system of the microscope includes a close-up optical system that faces an object, a pair of imaging optical systems that take object light rays passing through regions of the close-up optical system, and an illuminating optical system that guides illumination light emitted from a light source to illuminate the object. Each lens included in the close-up optical system has a semicircular shape in which one side is cut out. The close-up optical system is held in a first lens barrel, and the illuminating optical system is held in a second lens barrel. The second lens barrel is arranged in the cutout space of the close-up optical system inside the first lens barrel. A light shielding member is attached to the second lens barrel to prevent a leak of the illumination light through grooves formed on the second lens barrel.

10 Claims, 17 Drawing Sheets

MICROSCOPE WITH ILLUMINATING OPTICAL SYSTEM

BACKGROUND OF THE INVENTION

1. Field of the Invention

The present invention relates to a microscope for magnifying an object, and more particularly, to a microscope that is provided with an illuminating optical system for illuminating the object.

2. Description of the Related Art

A surgical microscope is used for magnifying minute tissues such as brain cells during surgery.

Since it is difficult to distinguish minute tissues of an intricate organ such as a brain by the naked eye, the surgical microscope is required to proceed surgery on such an organ.

Besides an observing optical system or an image taking optical system, the surgical microscope is frequently provided with an illuminating optical system to illuminate the object.

However, the illumination light may be the stray light for the observing optical system or the image taking optical system when the illumination light leaks out from a lens barrel of the illuminating optical system. Particularly, when the illuminating optical system includes a variable power lens to vary the illuminating region according to a zoom of the observing optical system or the image taking optical system, grooves are formed on the lens barrel to follow drive pins, the illumination light tend to leak out through the grooves.

On the other hand, the illuminating optical system has to include the variable power lens to vary the illuminating region. A two-group zoom lens that is known as a simple image taking zoom lens can be used as an illuminating lens.

However, since the image taking lens has a larger number of lens elements to correct aberrations than the illuminating lens, in general, an adoption of the image taking zoom lens results high cost and heavy weight. Particularly, the illuminating lens should have small F-number at the incident side when it takes divergent light exited from the light guide fiber bundle with efficiency, which further increases a number of the lens elements.

SUMMARY OF THE INVENTION

It is therefore a first object of the present invention to provide a microscope, which is able to prevent the incidence of the illuminating light into the observing optical system or the image taking optical system.

The second object of the present invention is to provide an illuminating lens, which is able to vary the illuminating region without increasing the number of lens element.

For the first object, according to the present invention, there is provided an improved microscope, which includes:

a close-up optical system that faces an object, one side of each lens included in the close-up optical system being cut out;

at least one imaging optical system that takes object light rays passing through a region of the close-up optical system, the region being offset from the optical axis of the close-up optical system in the direction opposite to the cutout side;

an illuminating optical system that guides illumination light emitted from a light source to illuminate the object;

a first lens barrel that supports the close-up optical system;

a second lens barrel that supports the illuminating optical system, the second lens barrel being arranged in the cutout space of the close-up optical system inside the first lens barrel; and a light shielding member attached to the second lens barrel to prevent a leak of the illumination light through grooves formed on the second lens barrel.

With this construction, since an inter-axis distance between the close-up optical system and the illuminating optical system can be kept small, the parallax becomes small, which reduces the deviation between the observation region and the illuminating region in spite of the working distance. Further, since the second lens barrel is covered by the light shielding member, the illumination light does not enter in the close-up optical system, which prevents the problem of the stray light.

The microscope may be an optical microscope used for an observation by the naked eye or a television microscope that electronically capture the image of the object. Further, the microscope may be a monocular type or a stereoscopic type that includes a pair of the imaging optical systems.

The shape of the cutout line of the close-up optical system in a plane view may be straight or curved. In particular case, the cutout portion may be a through hole. The cutout surface may be parallel to the optical axis of the close-up optical system or inclined.

The illuminating optical system may include an illuminating lens for projecting illumination light. The illuminating lens may consist of a single lens group or a plurality of lens groups. It is preferable that the illuminating lens contains a plurality of lens groups that are movable along the optical axis direction to change focal length of the illuminating lens.

The first lens barrel may include a fixed ring that is fixed to a housing of the microscope, a plurality of guide grooves being formed on the circumference of the fixed ring; a cam ring that is rotatably connected around the fixed ring, a plurality of cam grooves are formed on the circumference of the cam ring such that the cam grooves intersect obliquely with the guide grooves, respectively; and a plurality of moving lens frames that are inserted in the fixed ring with holding the lens groups, respectively.

In such a case, at least one drive pin is installed on each of the moving lens frame to penetrate the intersection between the guide groove and the cam groove, and the light shielding member is attached to the outer surface of the cam ring.

The light shielding member may be formed from metal or resin. The shape of the member may be a plate, a pipe or a sheet. The shielding member is preferably coated by anti-reflection material.

For the second object, according to the present invention, there is provided an improved illuminating lens, which includes: a first lens group of a positive refractive power, all of lenses included in the first lens group are positive lenses; and a second lens group of a negative refractive power that is located at the object side with respect to the first lens group, all of lenses included in the second lens group are negative lenses.

The first and second lens groups are movable along the optical axis direction to change degree of divergence of the illumination light projected to the object.

Since the illuminating lens has a larger allowance to the aberrations correction than an image taking lens, the above construction achieves sufficient result. That is, the illumination light uniformly illuminates the object through the illuminating lens.

With this construction, the number of lens elements can be reduced as compared with the two-group image taking zoom lens.

The first lens group may include at least two positive lenses. More preferably, the first lens group may consist of three positive lenses.

Since the positive refractive power of the first lens group is distributed among a plurality of positive lenses, the spherical aberration can be reduced, keeping uniformity of the illuminance distribution with the small F-number.

The second lens group preferably consists of a single negative lens to reduce the size and weight of the illuminating lens.

BRIEF DESCRIPTION OF DRAWINGS

The invention will be described below in detail with reference to the accompanying drawing, in which.

DESCRIPTION OF THE PREFERRED EMBODIMENT

The preferred embodiments of the present invention will now be described in detail below with reference to the accompanying drawings.

A video-type stereoscopic microscope (hereafter referred to as "stereoscopic microscope" for simplicity) according to the present embodiment is incorporated in a surgical operation supporting system that is used in cerebral surgical operations, for example. In this surgical operation supporting system, the three-dimensional image (stereovision image) of a tissue of a patient, which is taken by a stereoscopic microscope, is combined with CG (Computer Graphic) images, which is created from data about a diseased part in the tissue, in advance. The combined image is displayed on a stereoscopic viewer for a lead surgeon and on monitors for other staffs, and simultaneously recorded by a recording device.

The Overall Configuration of the Surgical Operation Supporting System

Figure 1:
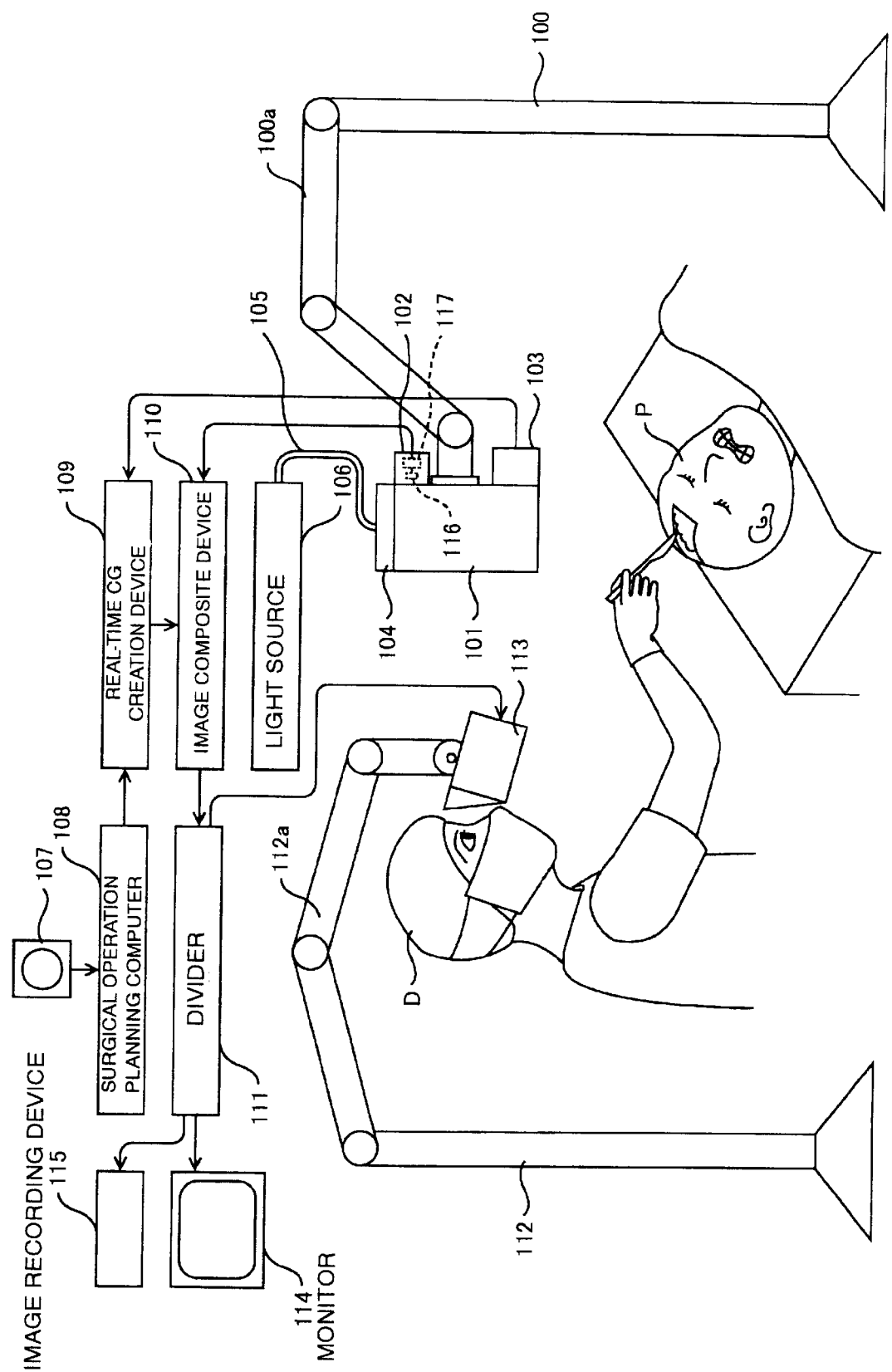
FIG. 1 is a schematic view showing an overall construction of a surgery support system equipped with a video-type stereoscopic microscope according to a preferred embodiment of the present invention.

FIG. 1 schematically shows an arrangement of the surgical operation supporting system. As shown in this figure, the surgical operation supporting system is composed of a stereoscopic microscope 101, a high definition CCD camera 102 attached on the upper end of the back surface of the stereoscopic microscope 101, a microscope position measurement device 103 attached on the lower end of the back surface of the stereoscopic microscope 101, a counter weight 104 attached on the top of the stereoscopic microscope 101, a light guide fiber bundle 105 inserted into the interior of the stereoscopic microscope 101 through a center hole made in the counter weight 104, a light source 106 emitting illumination light to be introduced into stereoscopic microscope 101 through the light guide fiber bundle 105, a surgical operation planning computer 108 having a disk device 107, a real-time CG creation device 109 connected to the microscope position measurement device 103 and to the surgical operation planning computer 108, an image composite device 110 connected to this real-time CG creation device 109 and the high definition CCD camera 102, a divider 111 connected to the image composite device 110, an image recording device 115, and a monitor 114 and a stereoscopic viewer 113 which are connected to the divider 111.

The disk device 107 stores image data, such as CT scan image data, MRI image data, SPECT image data, blood flow field image data, that have been obtained through various detecting process with respect to a diseased part of a patient P. The disc device 107 also stores three-dimensional graphic data of the diseased part and its surrounding tissues, which have been created based on the various kinds of image data in advance. The three-dimensional graphic data represents shape, size and position of the diseased part and its surrounding tissues in a three-dimensional local coordinate system that is defined with a predetermined reference point set on the outer skin or surface of internal tissues of the patient as origin, in accordance with vector format or map format.

The stereoscopic microscope 101 has a mount on its back surface and is detachably fixed to the distal end of a free arm 100a of a first stand 100 through the mount. Thus, the stereoscopic microscope 101 can be moved within the space where the free arm 100a of the first stand 100 can reach, and can also be inclined in an arbitrary direction. Hereinafter, the object side (that is, patient side) relative to the stereoscopic microscope 101 will be defined as "low", and the opposite side as "high", so that understanding thereof may be easy.

Since the optical configuration in this stereoscopic microscope 101 will be explained in detail later, only its schematics thereof will be explained here.

Figure 2:
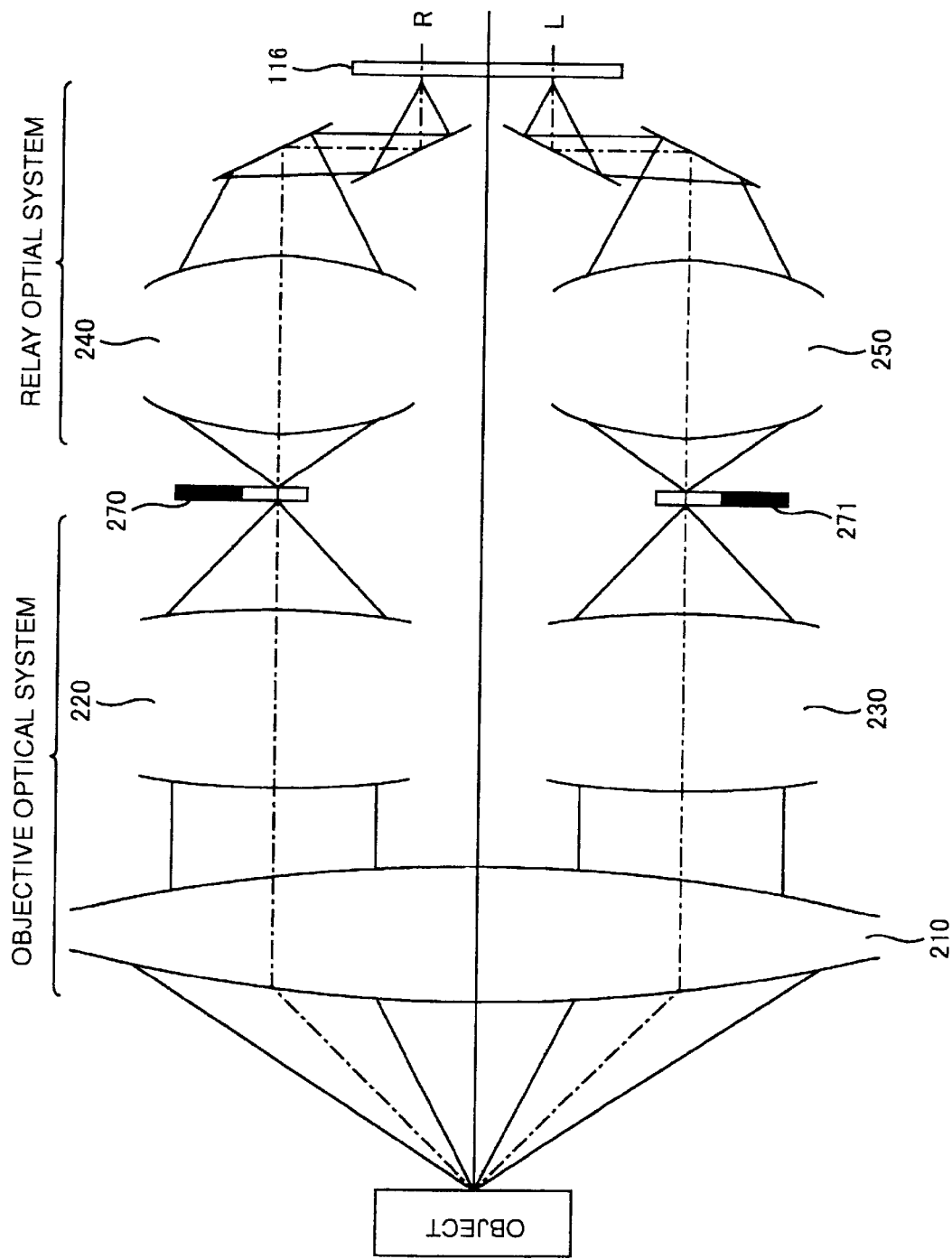
FIG. 2 is a schematic view showing an optical construction in the video-type stereoscopic microscope.

As shown in FIG. 2, primary images of an object are formed as aerial images at respective positions of right and left field stops 270, 271 through an object optical systems including a large-diameter close-up optical system 210 having a single optical axis and a pair of right and left zoom optical systems 220, 230, which respectively focus light rays that have passed through different portions of the close-up optical system 210. A pair of right and left relay optical systems 240, 250 relay the right and left primary images to from right and left secondary images on the right and left image taking regions in an image taking surface of a CCD 116 mounted in the high definition CCD camera 102, respectively. Each of the image taking regions has a vertical to horizontal aspect ratio of 9:8, while the image taking surface of the CCD 116 has a "high definition" size of which aspect ratio of vertical to horizontal is 9:16.

The close-up optical system 210, the right zoom optical system 220, and the right relay optical system 240 together constitute a right image taking optical system. The close-up optical system 210, the left zoom optical system 230, and the left relay optical system 250 together constitute the left image taking optical system. The close-up optical system 210 is common to the right and left image taking optical systems. The right and left zoom optical systems 220, 230 and the right and left relay optical systems 240, 250 are arranged with a predetermined base length therebetween.

The images which are thus formed on the right and left image taking regions of the image taking surface of the CCD 116 through the pair of image taking optical systems are equivalent to stereovision images including a pair of images taken from two locations which are separated from each other by the predetermined base length, which are arranged side by side. An output signal from this CCD 116 is converted to a high definition video signal by the image processor 117, and is outputted from the high definition CCD camera 102 to the image composite device 110.

The stereoscopic microscope 101 contains an illuminating optical system 300 (see FIG. 6) for illuminating the object that is located in the vicinity of the focal point of the close-up optical system 210. Illuminating light from the light source 106 is introduced into this illuminating optical system 300 via the light guide fiber bundle 105.

Returning to FIG. 1, the microscope positioning measurement device 103 measures the distance to the object that exists on the optical axis of the close-up optical system 210, the three-dimensional orientation of the optical axis of the close-up optical system 210, and the position of the above-mentioned reference point. The microscope positioning measurement device 103 then calculates the position of the object in the above-mentioned local coordinate system based upon these measurements. The information about the orientation of the optical axis and the position of the object is sent to the real-time CG creation device 109.

This real-time CG creation device 109 creates real-time CG images, such as wire frame images, of a diseased part such as a tumor based on the information about the orientation of the optical axis and the position of the object which are sent from the microscope position measurement device 103, and based on the three-dimensional data down-loaded from the operation planning computer 108. These CG images are so created that they are equivalent to the stereoscopic images as viewed along the optical axis direction with the same base length and the same distance as those of the optical system of the stereoscopic microscope 101. The real-time CG creation device 109 outputs CG image signals representing the created CG images to the image composite device 110, one after another.

This image composite device 110 superimposes the CG image signals obtained by the real-time CG creation device 109 onto the high definition video signal of the actual object, which is inputted from the high definition CCD camera 102, with appropriately adjusting its scale. In the image represented by the high definition video signal superimposed with the CG image signal, the shape, size and the position of the diseased part are indicated as CG images (such as wire frame images) on the real image thereof. The thus superimposed high definition video signals are divided by the divider 111, and are supplied to the stereoscopic viewer 113 for a lead surgeon D, to the monitor 114 for other surgical staffs or an advisor at a remote location, and to the recording device 115, respectively.

The stereoscopic viewer 113 is attached to the distal end of a free arm 112a of a second stand 112 in the downward direction, so that the stereoscopic viewer 113 can be suitably positioned in accordance with a posture of the lead surgeon D that facilitates his/her operations. The schematic structure of this stereoscopic viewer 113 is shown in FIG. 3.

Figure 3:
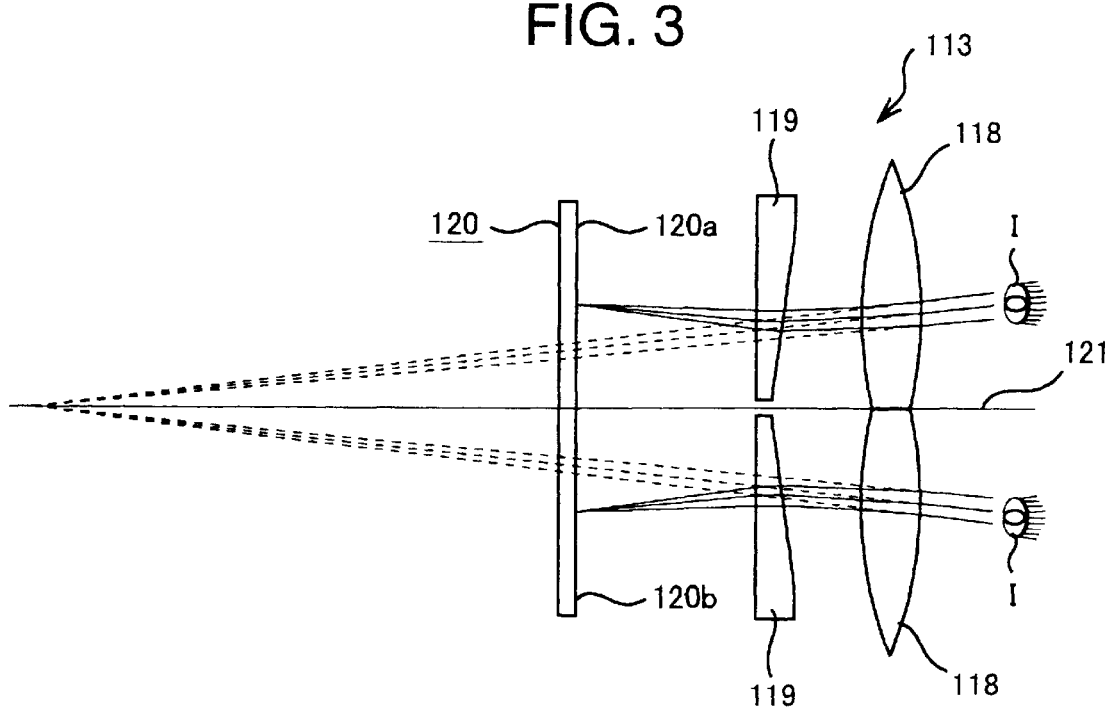
FIG. 3 is a schematic view showing an optical construction of a video-type stereoscopic viewer.
Figure 4:
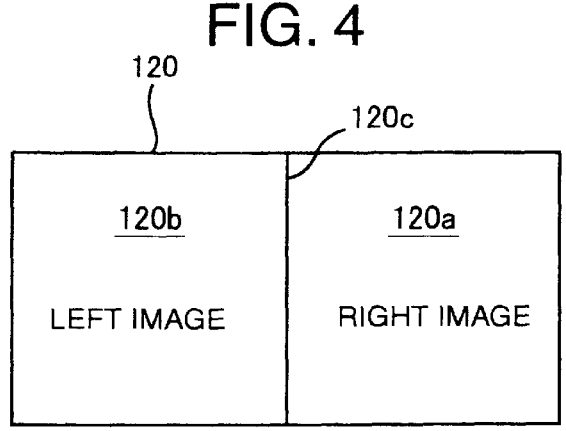
FIG. 4 is a plan view of an LCD panel.

As shown in the FIG. 3, the stereoscopic viewer 113 contains a high-definition-sized LCD panel 120 having an aspect ratio of 9:16 as a monitor. When the high definition video signal from the divider 111 is inputted into the LCD panel 120, as shown in the plan view of FIG. 4, the left half 120b of the LCD panel 120 displays the image taken by the left image taking region of CCD 116, and the right half 120a thereof displays the image taken by the right image taking region of CCD 116. A boundary 120c of these right and left images may be shifted or tilted depending upon adjustment of field stops 270, 271, which will be explained later.

The light paths in the stereoscopic viewer 113 are divided into the right and the left by a partition 121, which is installed along a direction perpendicular to the LCD panel 120 at the boundary 120c which emerges when the field stops 270, 271 are properly adjusted. At each side of the partition 121, a wedge prism 119 and an eyepiece 118 are disposed in that order from the side of LCD panel 120. The eyepiece 118 forms a magnified virtual image of the image displayed on the LCD panel 120 at a position that is located 1 m (−1 diopter) in front of observing eyes I. The wedge prism 119 adjusts the direction of the light such that the angle of convergence of the observing eyes I may correspond to that in case of observing an object placed 1 m in front of the eye I naked, thereby enabling natural three-dimensional observation.

As described above, the images obtained by the stereoscopic microscope 101 are superimposed with CG image such as a wire frame, which is created based upon images taken by various image-taking devices in advance, in order to show the shape, size, and the position of the diseased part.

The superimposed images are viewed as three-dimensional images through the stereoscopic viewer 113 and displayed by the monitor 114. Accordingly, the lead surgeon D and other surgical staffs who are observing these images can easily identify the diseased part, which would be difficult to be identified with actual images only. Thus, the surgical operations can be conducted in a fast and accurate manner.

The Configuration of the Stereoscopic Microscope

Figure 5:
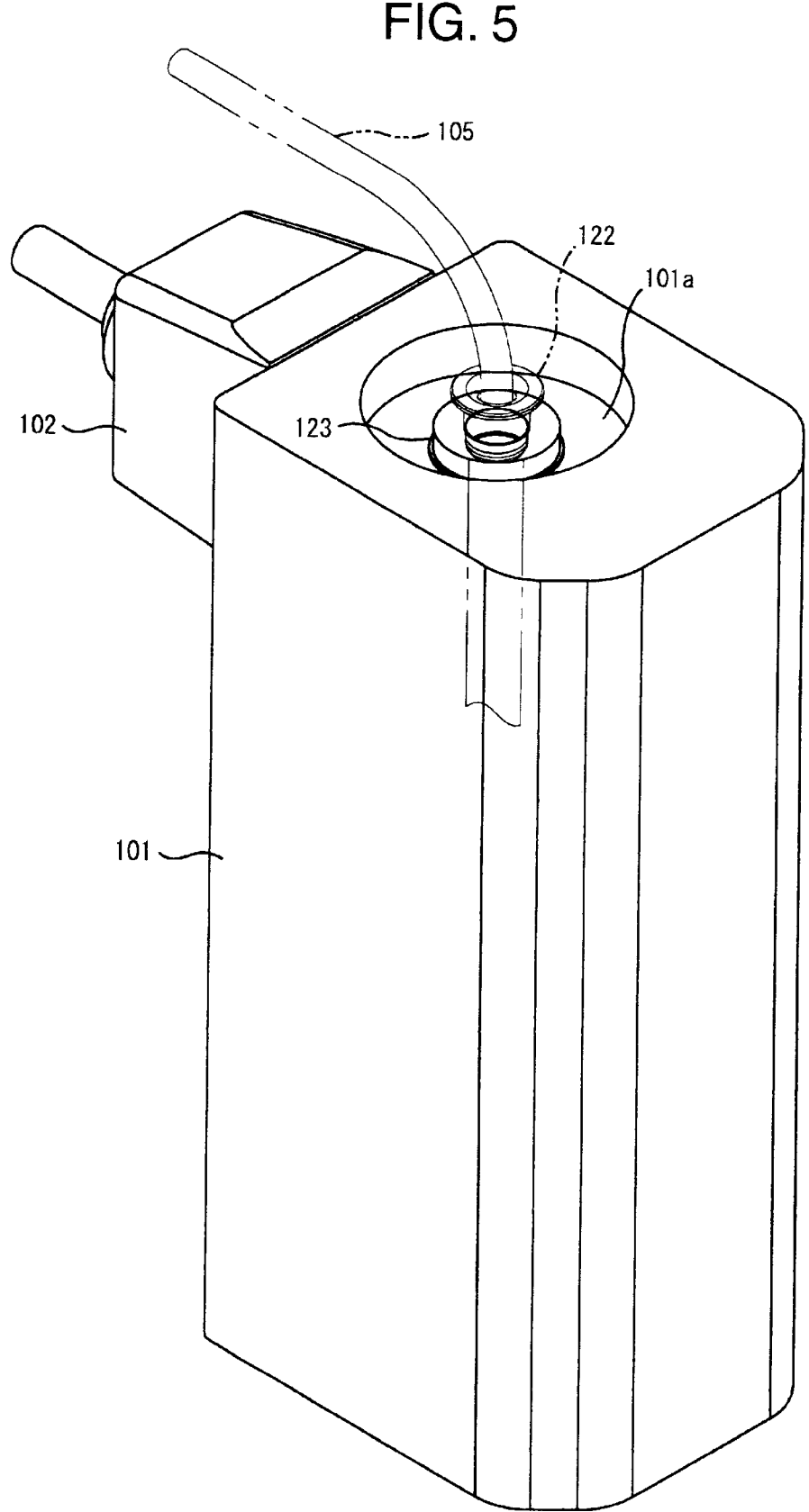
FIG. 5 is a perspective view showing an outer appearance of the stereoscopic microscope.

The structure of the above-mentioned stereoscopic microscope 101 (including the high definition CCD camera 102) is explained in more detail. As shown in FIG. 5, this stereoscopic microscope 101 has a shape of substantially polygonal column. The back surface of the stereoscopic microscope 101 is flat and is attached with the high definition CCD camera 102, and the front surface (that is, the opposite side of the back surface) has chamfered edges on both sides. At the center of the top surface, a circular recess 101a is formed. At the center of the recess 101a, an insertion opening (not illustrated) is bored so as to be inserted with a guide pipe 122, which is a cylindrical member fixedly covering the distal end of the light guide fiber bundle 105. Here, an annular-shaped member (that is, fiber guide insertion part) 123 attached to the insertion opening is a chuck for fixing the guide pipe 122 inserted into the insertion opening.

Optical Configuration

Figure 6:
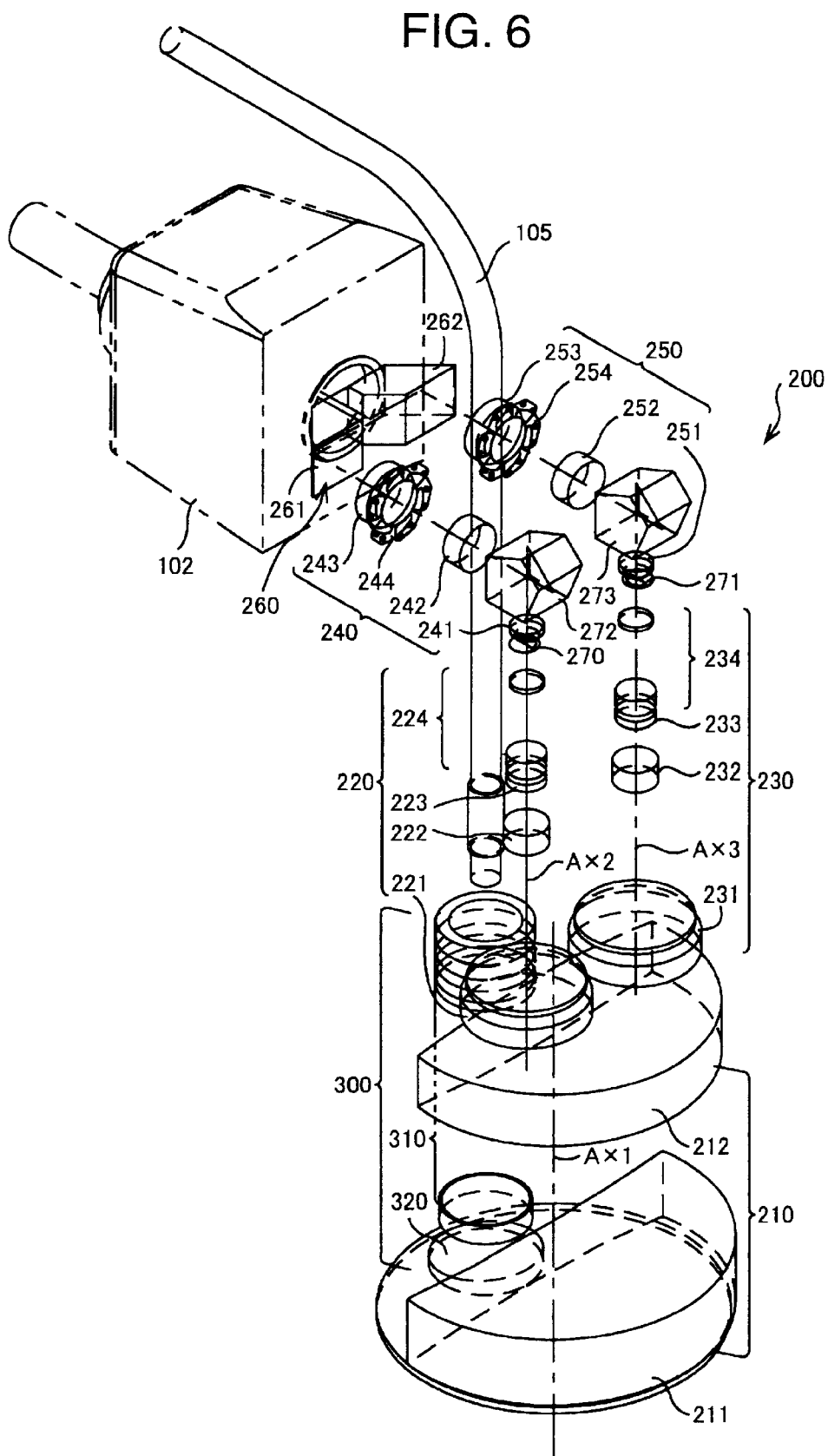
FIG. 6 is a perspective view showing an overall construction of a microscope optical system.
Figure 7:
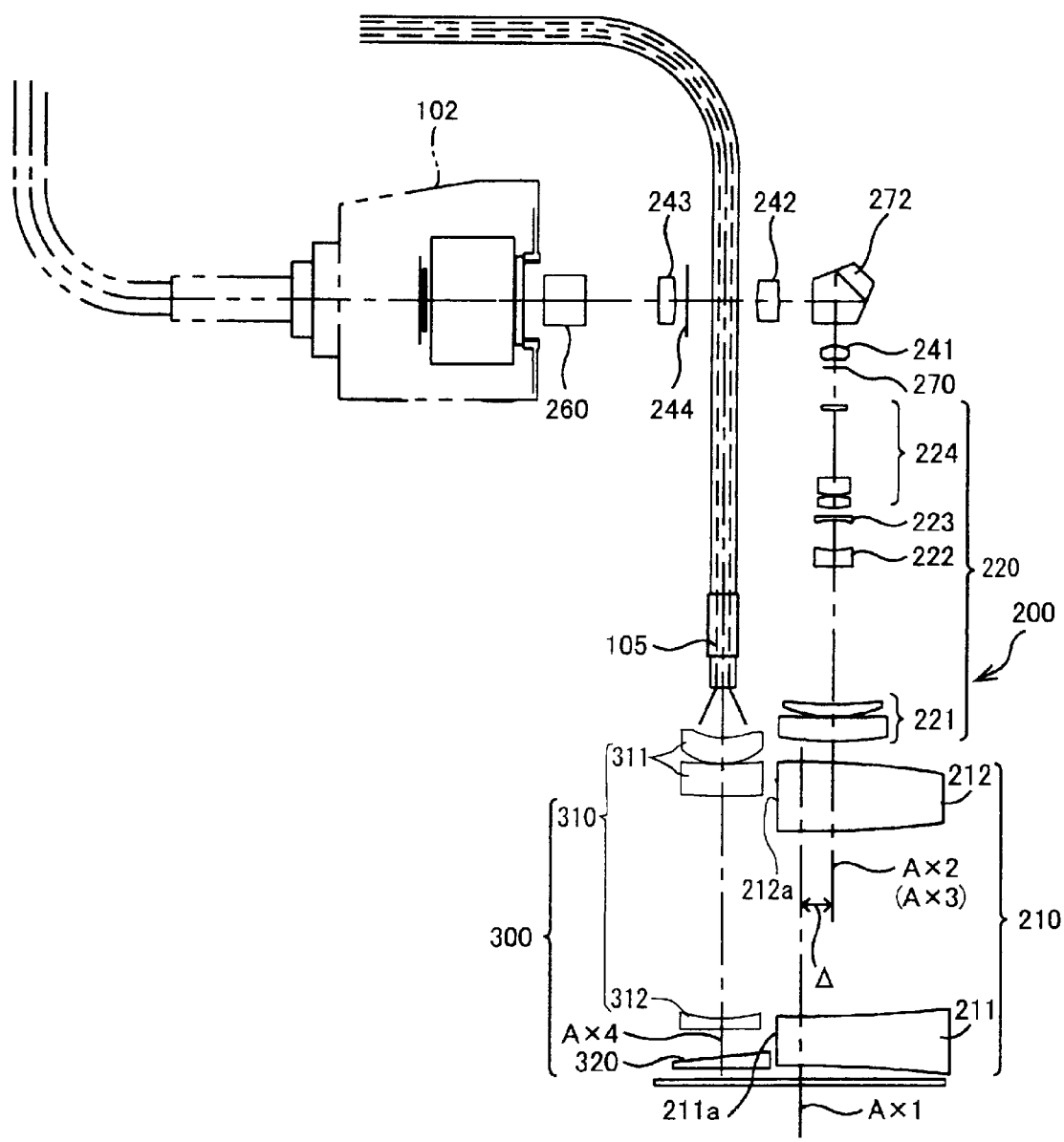
FIG. 7 is a side view showing an overall construction of the microscope optical system.
Figure 8:
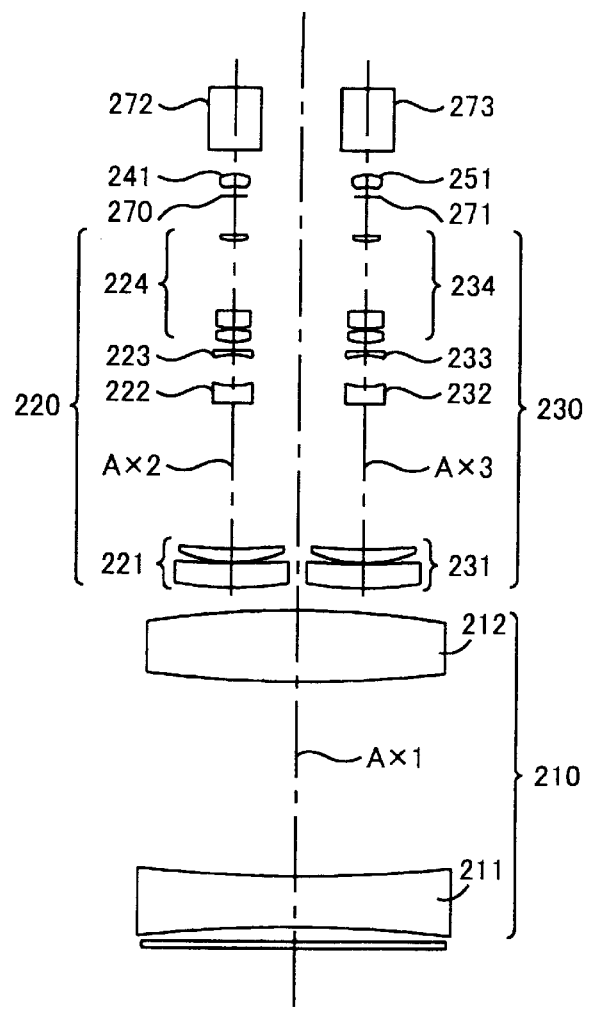
FIG. 8 is a front view showing an overall construction of the microscope optical system.
Figure 9:
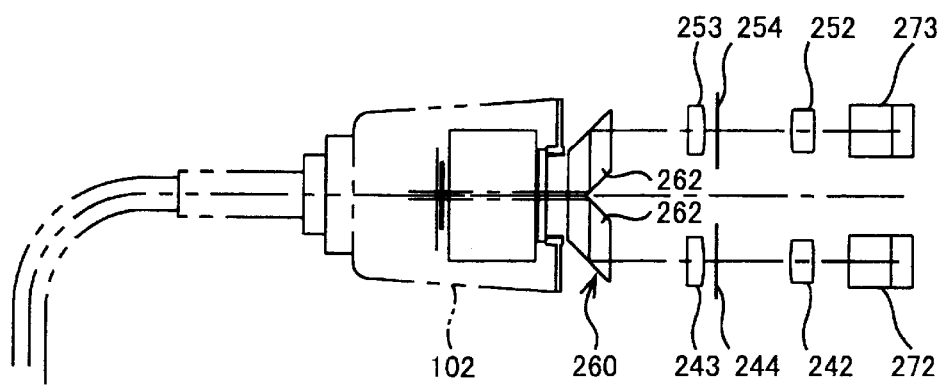
FIG. 9 is a plan view showing an overall construction of the micro-scope optical system.

Next, the optical configuration of the stereoscopic microscope 101 will be explained with reference to FIGS. 6 to 9. FIG. 6 is a perspective view of an overall structure of the microscopic optical system; FIG. 7 is a side view; FIG. 8 is a front view; and FIG. 9 is a plan view of the microscopic optical system.

As shown in FIG. 6, the microscopic optical system includes an image taking optical system (a pair of right and left image taking optical systems) 200 for electrically taking an image of an object, and an illuminating optical system 300 for illuminating the object with illuminating light guided from the light source 106 through the light guide fiber bundle 105.

The image taking optical system 200 includes an objective optical system, which includes a common close-up optical system 210 and a pair of right and left zoom optical systems 220, 230, for forming the primary images of the object; a pair of right and left relay optical systems 240, 250 for forming the secondary images by relaying the primary images; and an inter-axis distance reducing prism 260 as an inter-axis distance reducing element that brings the object light rays from the relay optical systems 240, 250 close to each other.

Also, at the positions where the primary images are formed by the zoom optical systems 220, 230, field stops 270, 271 are respectively disposed. In the relay optical systems 240, 250, pentagonal prisms 272, 273 are placed as optical path deflecting elements for deflecting the respective light paths at the right angle.

According to this construction, right and left images with a predetermined parallax can be formed on adjacent two regions of the CCD 116 installed in the CCD camera 102. Here, in the following explanations of optical systems, a "horizontal direction" is the direction that coincides with the longitudinal direction of the image taking surface of the CCD 116 when images are projected thereon, and a "vertical direction" is the direction that is perpendicular to the horizontal direction relative to the CCD 116.

Each of the optical systems will be explained hereinafter.

As shown in FIGS. 6, 7 and 8, the close-up optical system 210 includes a first lens 211 of a negative refractive power, and a second lens 212 of a positive refractive power arranged in that order from the object side. The second lens 212 moves along the optical axis direction for focusing in accordance with the object distance.

That is, since the second lens 212 is adjusted so that an object is placed at the object-side focal point of the close-up optical system 210, the close-up optical system 210 behaves like a collimator lens to convert divergent light from the object into substantially parallel light.

The plane shape of each of the first and second lenses 211, 212 of the close-up optical system 210, as viewed from the zoom optical systems 220 and 230, is a semicircular shape in which one side is cut out (D-cut). The illuminating optical system 300 is disposed at the cutout portions.

A pair of zoom optical systems 220, 230 focus a focal object light from the close-up optical system 210 at the positions of the field stops 270, 271, respectively.

As shown in FIGS. 6 to 8, the right zoom optical system 220 includes first through fourth lens groups 221, 222, 223 and 224 of positive, negative, negative and positive refractive powers, respectively, in that order from the side of the close-up optical system 210. The first and fourth lens groups 221, 224 are fixed, and the second and third lens groups 222, 223 move for zooming along the optical axis direction. The second lens group 222 moves mainly to change the magnification, and the third lens group 223 moves to maintain the focal position.

Like the right zoom optical system 220, the left zoom optical system 230 includes the first through fourth lens groups 231, 232, 233, and 234. The right and left zoom optical systems 220, 230 are interlocked by a driving mechanism (not shown in the figures), whereby the magnifications of the right and left images can be changed simultaneously.

The optical axes Ax2, Ax3 of the zoom optical systems 220, 230 are in parallel with the optical axis Ax1 of the close-up optical system 210. A first plane that includes these optical axes Ax2, Ax3 of the zoom optical systems 220, 230 is offset from a second plane, which is parallel to the first plane and includes the optical axis of the close-up optical system 210, by a distance Δ at the opposite side of the D-cut portion.

The diameter of the close-up optical system 210 is set to be larger than the diameter of a circle that includes the maximum effective diameters of the zoom optical systems 220, 230 and the maximum effective diameter of the illuminating optical system 300. As described above, since the optical axes Ax2, Ax3 of the zoom optical systems 220, 230 are positioned oppositely to the D-cut portion with respect to the optical axis Ax1, the illuminating optical system 300 can be placed inside of a circular region defined by the diameter of the close-up optical system 210, thereby enabling a compact overall construction.

Furthermore, the separate construction between the close-up optical system 210 and the pair of right and left zoom optical systems 220, 230 enables to simplify the adjusting mechanism and the optical design while keeping a long working distance (the distance from the object to the nearest surface of the close-up optical system 210) and a high zoom ratio. Namely, since the close-up optical system 210 is shared between the right and left images, the movement of the single lens adjusts the focuses of the right and left images, which simplifies the focus adjusting mechanism. Further, the close-up optical system 210 only collimates the object light and each of the right and left zoom optical systems 220, 230 only forms the primary image when the parallel light is incident thereon, which simplifies the lens design of each of the optical systems. Since the four-group zoom lens has a high zoom ratio while keeping a constant entire length, it is preferable to be used as an intermediate optical system among the plurality of optical systems.

The field stops 270, 271 are disposed on design positions at which the primary images are to be formed by the zoom optical systems 220, 230 having designed performance. As shown in FIG. 6, each of the field stops 270, 271 has a circular outline shape, and have a semi-circular aperture concentric with circular outline on the inner side in the horizontal direction. The field stops 270, 271 are disposed such that the straight edges of these apertures coincide with the vertical direction corresponding to the boarder line of the right and left images on the CCD 116, and such that only the inner parts of light flux can be transmitted.

The microscope according to the present embodiment needs to avoid overlapping of the right and left images on the CCD 116 in order to form the right and left secondary images on adjacent regions of the single CCD 116. Therefore, the field stops 270, 271 are placed at the position of the respective primary images. The straight-line edge of the semi-circular shaped aperture of each of those field stops 270, 271 functions as a knife-edge, so that only light rays traveling inside the edge can pass through the field stop 270,271. The primary images formed on the field stops 270, 271 are re-imaged through the right and left relay optical systems 240, 250 as secondary images. The resultant secondary images are reversed in the horizontal direction and in the vertical direction with respect to the primary images. Thus, the knife edges defining the outside edges in the horizontal direction at the positions of the primary images define the inside edges in the horizontal directions at the positions of the secondary images, which clearly defines the boundary of the right and left images.

The relay optical systems 240, 250 includes three lens groups of positive refractive powers, respectively. As shown in FIGS. 6 and 7, the right relay optical system 240 includes a first lens group 241 composed of a single positive meniscus lens, a second lens group 242 having a positive refractive power as a whole, and a third lens group 243 composed of a single biconvex lens. The object side focal point of the combination of the first and second lens groups 241 and 242 is coincident with the image forming plane of the primary image formed by the zoom optical system 220. That is the same position as the field stop 271. The third lens group 243 converges parallel light transmitted from the second lens group 242 onto the image taking surface of the CCD 116. Between the first lens group 241 and the second lens group 242, the pentagonal prism 272 is disposed for deflecting the light path at the right angle. Between the second lens group 242 and the third lens group 243, an aperture stop 244 is installed for adjusting the light amount.

Like the right relay optical system 240, the left relay optical system 250 includes the first, second and third lens groups 251, 252 and 253. The pentagonal prism 273 is disposed between the first lens group 251 and the second lens group 252, and an aperture stop 254 is installed between the second lens group 252 and the third lens group 253.

The divergent light that has passed through the field stops 270, 271 is converted to substantially parallel light through the first lens groups 241, 251 and the second lens groups 242, 252 of the relay optical systems. After passing through the aperture stops 244, 254, the light rays are re-converged through the third lens groups 243, 253 to form the secondary images.

Since the pentagonal prisms 272, 273 are disposed inside the relay optical systems 240, 250, the total length of the image taking optical system 200 along the optical axis Ax1 of the close-up optical system 210 can be shortened. Further, if a mirror is used as the optical path deflecting element, a setting angle error of the mirror largely deviates the direction of the reflected light. On the other hand, the pentagonal prism keeps the direction of the reflected light when it rotates around an axis that is perpendicular to a plane including the optical axis of the zoom optical system before and after the deflection by the pentagonal prism.

Further, the second lens groups 243, 252 and the third lens groups 243, 253 in the relay optical systems 240, 250 are adjustable in the direction of the optical axis and in the direction perpendicular to the optical axis. When the second and third lens groups 242, 252, 243, 253 move along the optical axis direction, the resultant focal lengths of the first and second lens groups vary, which changes the magnification (the image height of the secondary images) of the relay optical systems 240, 250. Furthermore, adjustments of the third lens groups 243, 253 along the optical axis direction change the position of the secondary images along the optical axis direction, which enables the focus adjustment with respect to the CCD 116. In addition, when the second lens groups 242, 252 and the third lens groups 253, 253 are adjusted as a unit in a direction perpendicular to the optical axis, the positions of the secondary images are adjusted in a plane perpendicular to the optical axis.

For such adjustments, the second lens group 242 and the third lens group 243 in the right relay optical system 240 are held in a unitary outer lens barrel, and the third lens group 243 is further held in an inner lens barrel, which is movable relative to the outer lens barrel in the direction of the optical axis. In the same manner, the second lens group 252 and the third lens group 253 in the left relay optical system 250 are held in an outer lens barrel and the third lens group 253 is further held in an inner lens barrel.

Since the second lens groups 242, 252 and the third lens groups 243, 253 are movable in this matter for enabling various adjustments, if the pentagonal prisms 272, 273 were placed between these lens groups, the adjustment mechanism would become more complex. Therefore, it is preferable to place the pentagonal prisms 272, 273 between the field stops 270, 271 and the second lens groups 242, 252. Moreover, since the degree of divergence of the object light is reduced by the first lens groups 241, 251, the pentagonal prisms 272, 273 are preferably placed between the first lens groups 241, 251 and the second lens groups 242, 252 in order to make the effective diameter of the pentagonal prisms smaller.

The inter-axis distance reducing prism 260 is disposed between the relay optical systems 240, 250 and the CCD camera 102 to reduce the distance between the right and left object light rays from the respective relay optical systems 240, 250. To attain real stereoscopic feeling by the stereoscopic observation, it is necessary to have a predetermined base length between the right and left zoom optical systems 220, 230 and between the right and left relay optical systems 240, 250. On the other hand, to form secondary images on the adjacent regions on the CCD 116, it is necessary to shorten the distance between the optical axes than the base length. The inter-axis distance reducing prism 260 brings the optical axes of the relay optical systems close to each other, which enables to form secondary images on the same CCD 116 while keeping the predetermined base length.

As shown in FIGS. 6 and 9, the inter-axis distance reducing prism 260 includes a pair of optical axis shifting prisms 261, 262 having shapes of the pentagonal columns, which are symmetric to each other. The prisms 261, 262 are arranged in a right and left symmetric configuration with a spacing of about 0.1 mm therebetween.

As shown in FIG. 9, each of the optical axis shifting prisms 261, 262 has incident and exit surfaces that are parallel to each other, and has first and second reflecting surfaces in the respective outer side and inner side, which are also parallel to each other. Viewed in the direction parallel to the incident and exit surfaces and reflecting surfaces, these optical axis shifting prisms 261, 262 have a pentagonal shape formed by cutting out an acute-angle corner of a parallelogram with a line perpendicular to the exit surface. The optical axis shifting prisms 261, 262 may be replaced by a pair of separated mirrors. Nevertheless, the prism having two internal reflecting surfaces is used in the embodiment, so that the positional relationship between the two reflecting surfaces is fixed, which eases the adjustment as compared with a use of a pair of separated mirrors.

The object lights from the relay optical systems 240, 250 are incident on the incident surfaces of the respective optical axis shifting prisms 261, 262; internally reflected by the outer reflecting surfaces so as to be directed in right-to-left direction; internally reflected by the inner reflecting surfaces so as to be directed to the optical axis directions that are the same as the incident direction; and are exited from the exit surfaces so as to be incident on the CCD camera 102. As a result, the distance between the right and left object light rays is narrowed without altering the traveling directions, and the secondary images are formed on the single CCD 116.

The illuminating optical system 300 has the function of projecting illumination light onto the object, and, as shown in FIG. 6 and FIG. 7, includes an illuminating lens 310 for adjusting the degree of divergence of divergent light emitted from the light guide fiber bundle 105 and a wedge prism 320 for deflecting the illumination light to coincide the illuminating region with the image taking region. As shown in FIG. 7, the optical axis Ax4 of the illuminating lens 310 is parallel to the optical axis Ax1 of the close-up optical system 210, and is offset from the optical axis Ax1 by a predetermined amount. Therefore, if the wedge prism 320 is not disposed, the center of the illuminating region would not coincide with the center of the image taking region, which wastes some amount of illuminating light. The wedge prism 310 matches the illuminating region with the image taking region, which enables effective use of the illuminating light.

Further, the illuminating lens 310 is a zoom lens that consists of a first lens group 311 of a positive refractive power and a second lens group 312 of a negative refractive power, as shown in FIG. 7. Both of the lens groups 311 and 312 move along the optical axis direction to vary a divergent angle of the illumination light in accordance with the zooming of the zoom optical systems 220 and 230. Thus, the illuminating region varies such that the observed object located inside the view angle of the objective optical system is well illuminated.

All of the lens elements included in the first lens group 311 of the illuminating lens 310 are positive lenses, and all of the lens elements included in the second lens group 312 are negative lenses. Such a construction enables to simplify the lens arrangement while keeping sufficient performance for the illumination lens. Namely, the number of lens element can be reduced as compared with the conventional two-group zoom lens.

Further, since the illuminating optical system 300 is arranged in the cut-out space of the close-up optical system 210 inside the lens barrel 1, the inter-axis distance therebetween becomes small, which reduces the parallax between the close-up optical system 210 and the illuminating optical system 300.

Mechanism for Holding Optical System

Next, the mechanical constructions for supporting the optical instruments will be described hereinafter.

Figure 10:
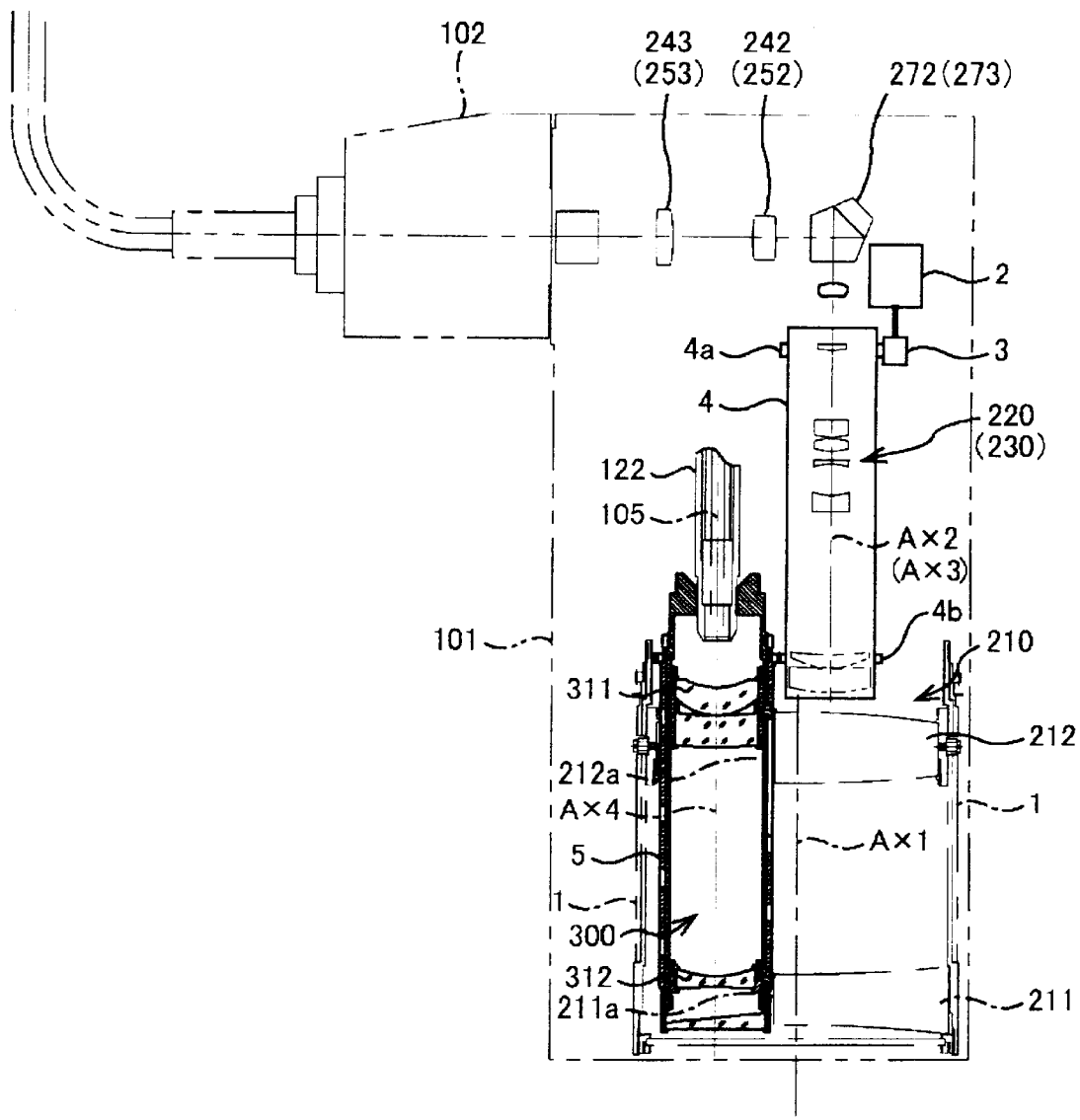
FIG. 10 is a perspective view showing arrangements of lens barrels in a casing of the stereoscopic microscope.

As shown in FIG. 10, the close-up optical system 210 is held by a lens barrel 1 that consists of a plurality of nested barrels, which are a fixed barrel, a cam ring and a lens frame. The cam ring of the lens barrel 1 is driven by a drive source such as a motor or is manually driven, which moves the second lens 212 along the optical axis direction.

The zoom optical systems 220, 230 are, as shown in FIG. 10, held in zoom barrels 4 that have well-known constructions. Each of the zoom lens barrels 4 has a pair of ring gears 4a and 4b in upper and lower sides of the barrel. These ring gears 4a and 4b rotate together with a cam ring installed in the lens barrel 4. The upper ring gears 4a of the lens barrels 4 are engaged to a pinion 3 that is attached to a common motor 2. The rotation of the motor 2 rotates the cam rings, which simultaneously changes the focal lengths of the zoom optical systems 220 and 230.

On the other hand, the illuminating optical system 300 is held by a zoom lens barrel 5 that is interlocked with the lens barrel 4. Next, the structure of the zoom lens barrel 5 is explained in detail.

Figure 11:
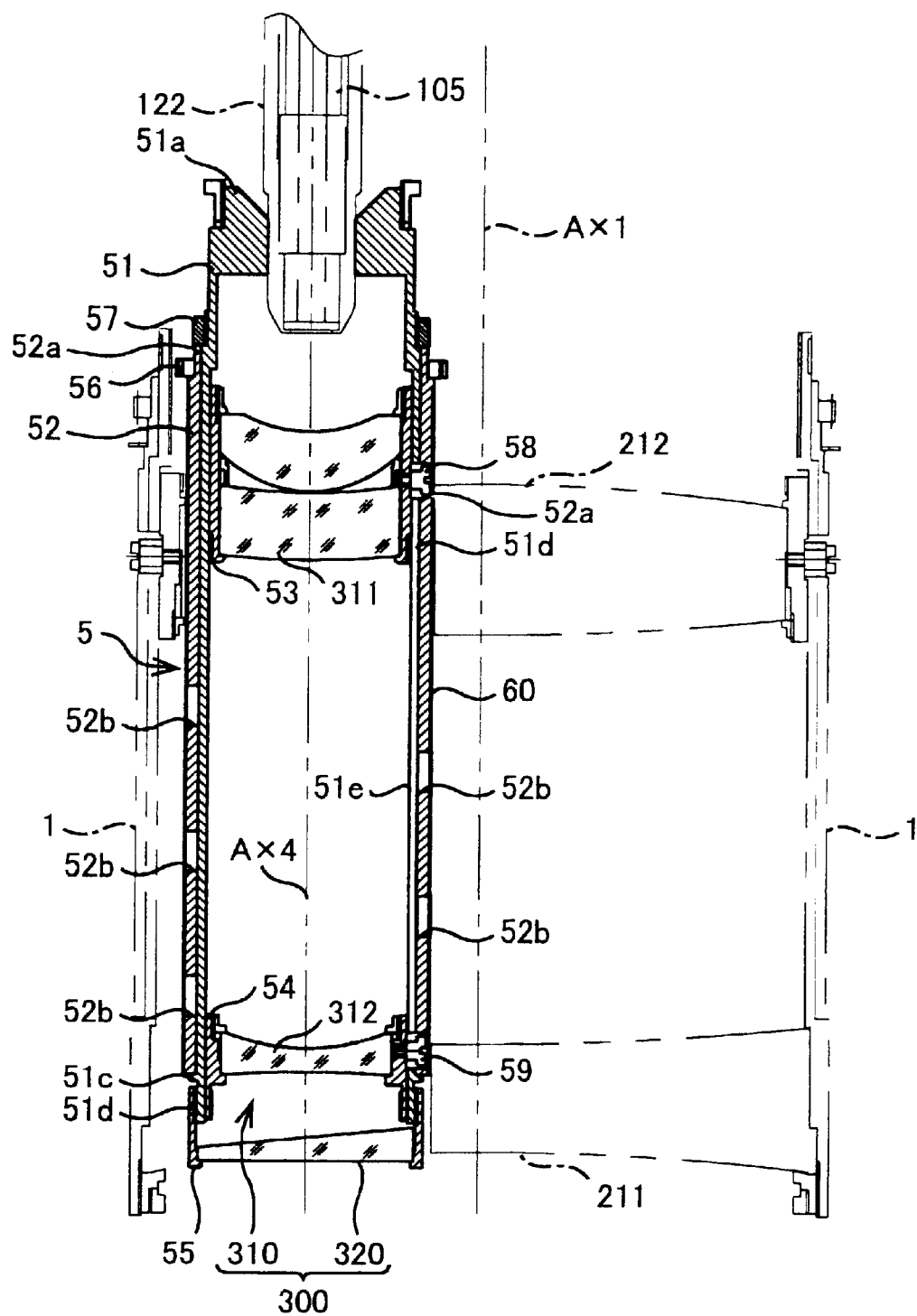
FIG. 11 is a sectional view of a zoom barrel of the illuminating optical system shown in FIG. 10.
Figure 12:
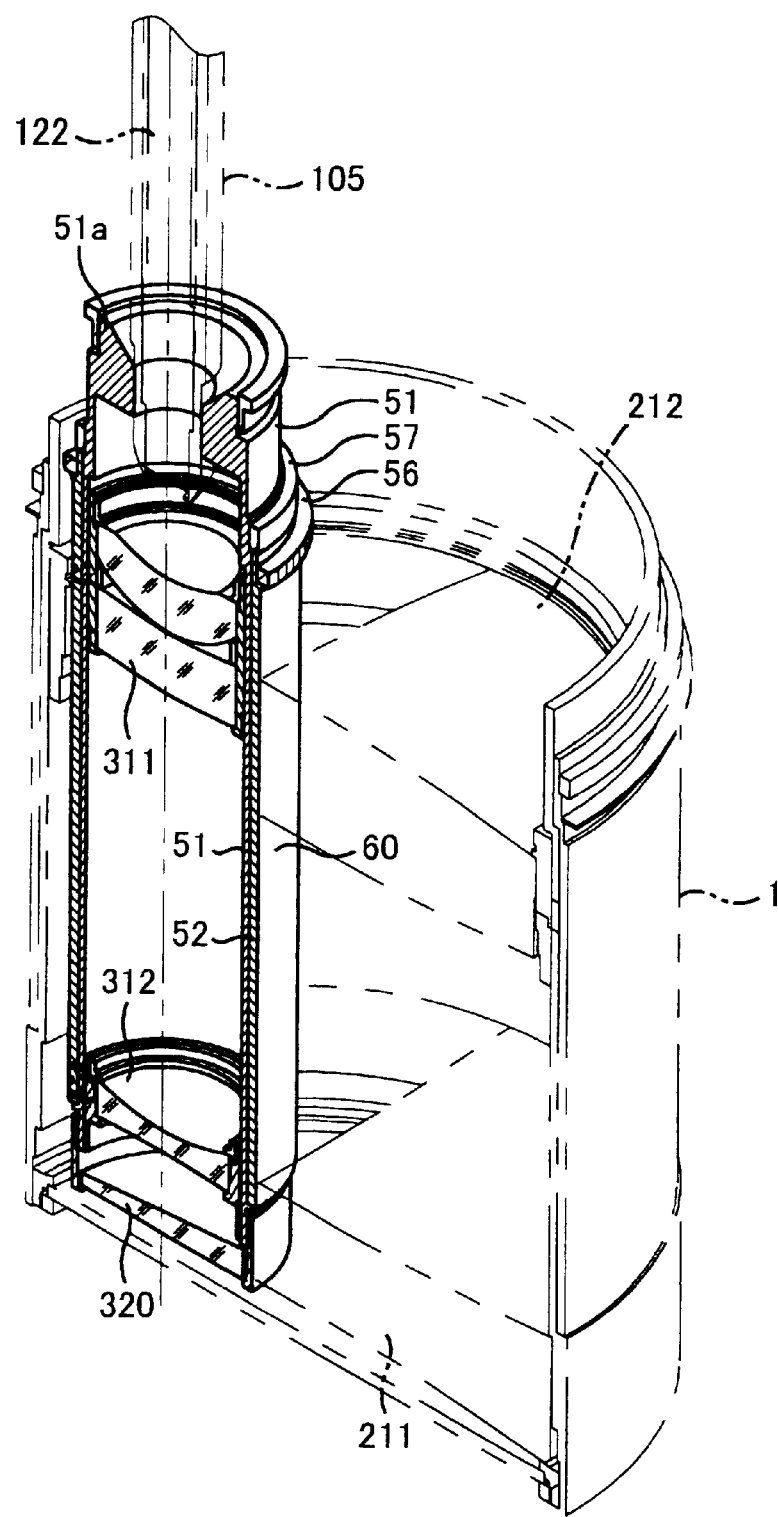
FIG. 12 is a perspective sectional view of the zoom barrel of the illuminating optical system shown in FIG. 10.
Figure 13:
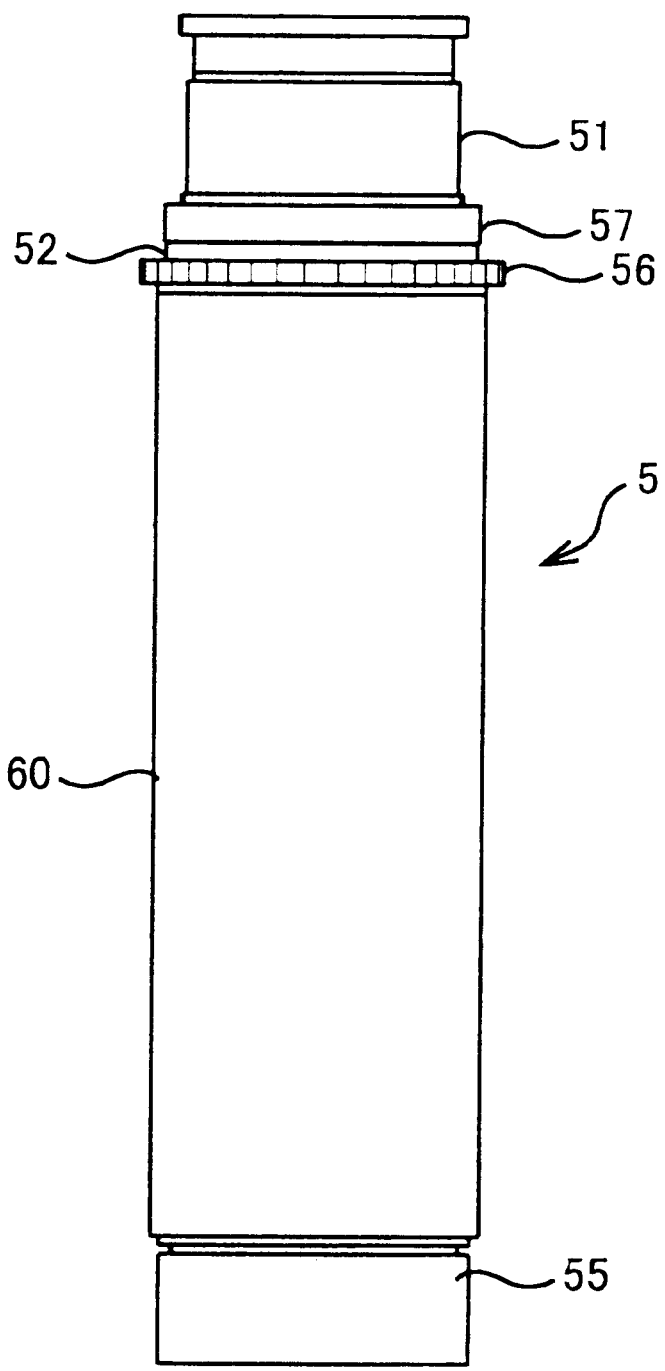
FIG. 13 is a side view of the zoom barrel of the illuminating optical system.
Figure 14:
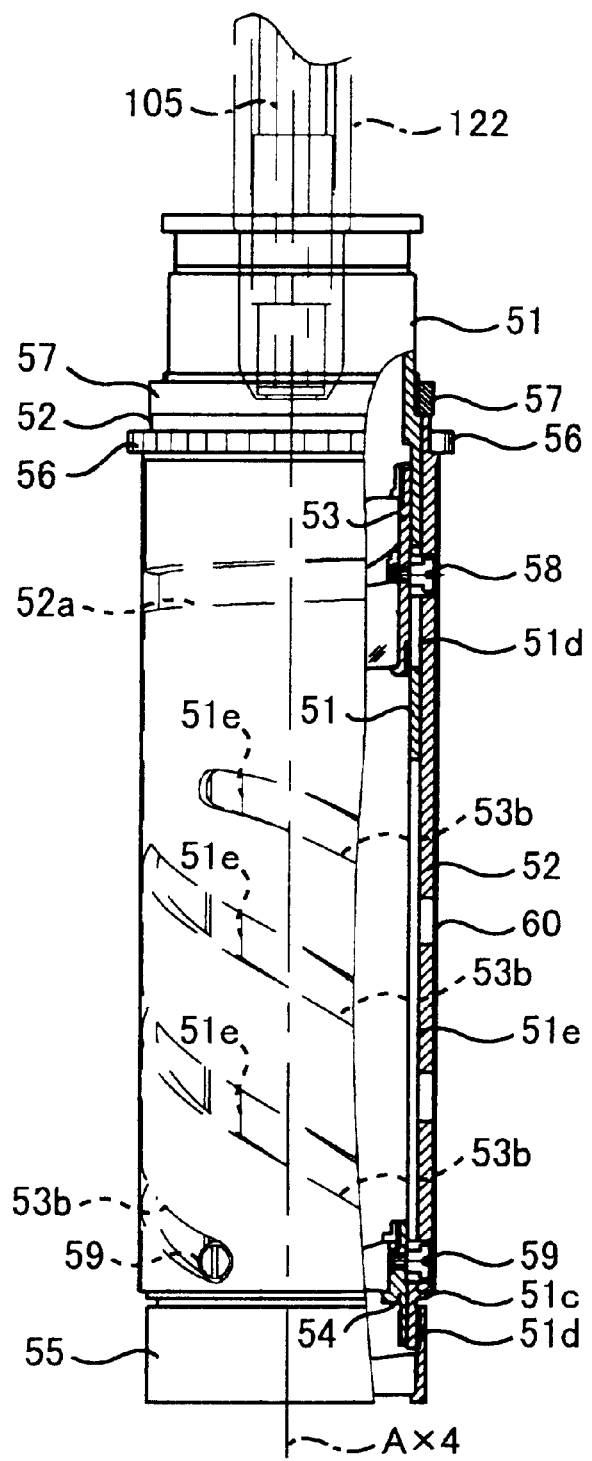
FIG. 14 is a perspective view with partial sectional portion of the zoom barrel of the illuminating optical system.

FIG. 11 is a magnified vertical cross-sectional view showing the periphery of the zoom lens barrel 5 and the close-up optical system 210. The cross-section is taken along a plane including the optical axis Ax4 of the illuminating optical system 300 and the optical axis Ax1 of the close-up optical system 210. FIG. 12 is a perspective view of the zoom lens barrel 5 sectioned by the cross-section of FIG. 11. FIG. 13 is a side view of the zoom lens barrel 5, and FIG. 14 is a perspective view of the zoom lens barrel including partial cross-section.

As shown in these figures, the zoom lens barrel 5 includes a fixed ring 51 fixed to the housing of the stereoscopic microscope 101, a cam ring 52 that is rotatably connected around the fixed ring 51, a first moving lens frame 53 that holds the first lens group 311, a second moving lens frame 54 that holds the second lens group 312, and a prism holding frame 55 that holds a wedge prism 320. The first and second moving lens frames 53 and 54 are inserted in the fixed ring 51 and are moveable inside the fixed ring 51 in the direction of the optical axis. The prism holding frame 55 is screwed and fixed to the lower end of the fixed ring 51. A cam gear 56 is embedded into the outer surface of the cam ring 52 adjacent to its upper end in non-rotatable manner.

The upper end of the fixed ring 51 is formed as a receiving part 51a that includes a conical guide surface and the insertion opening. The tip of the guide pipe 122 for the light guide fiber bundle 105 is coaxially inserted in the receiving part 51a. The insertion opening has an inner diameter substantially equal to an outer diameter of the guide pipe 122.

Further, an outer flange 51c is formed adjacent to the lower end of the fixed ring 51, and a stop ring 57 is screwed and fixed adjacent to the stepped part adjacent to the upper end of the fixed ring 51. The cam ring 52 is rotatable around the fixed ring 51, while the flange 51c and the stop ring 57 keep the cam ring 52 from a movement in the axial direction.

Moreover, a male thread 51b is formed for screwing the prism holding frame 55 at a portion closer to the bottom end than the flange 51c.

On the circumference of the fixed ring 51, a first guide groove 51d that limits the moving range of the first moving lens frame 53 and three second guide grooves 51e that limit the moving range of the second moving lens frame 54 are formed. These guide grooves are formed as slits that extend in parallel with the center axis of the fixed ring 51. The second guide grooves 51e are formed at an equal angular interval (120 degrees) around the circumference.

On the circumference of the cam ring 52, a first cam groove 52a that intersects obliquely with the first guide groove 51d and three second cam grooves 52b that respectively intersect obliquely with the second guide grooves are formed. These cam grooves are formed as slits in a spiral manner over 360 degrees. The second cam grooves 52b are formed as three grooves in a triple spiral manner at an equal angular interval with respect to the center axis of the cam ring 52.

A first drive pin 58 is installed on the outer surface of the first moving lens frame 53, and three second drive pins 59 are installed on the outer surface of the second moving lens frame 54. The first drive pin 58 penetrates the intersection between the first guide groove 51d and the first cam groove 52a, and the second drive pins 59 penetrate the respective intersections between the second guide grooves 51e and the second cam grooves 52b.

Since the moving range of the first lens frame 53 is shorter than that of the second lens frame 54, the first guide groove 51d is shorter than that of the second guide grooves 51e, and the lead angle of the first cam groove 52a is smaller than that of the second cam grooves 52b.

Accordingly, when the cam ring 52 is rotated relative to the fixed ring 51, the respective drive pins 58, 59 move in the axial direction. As a result, the first moving lens frame 53 and the second moving lens frame 54 are drawn by the respective driving pins 58, 59 and are moved inside the fixed ring 51 in the axial direction.

Here, at the periphery of each drive pin 58 and 59, a roller is installed to reduce a slide friction with respect to each groove 51d, 52a, 51e and 52b. Also, the outer end face of the respective drive pins 58, 59 are positioned inside the outer circumferential surface of the cam ring 52.

According to the construction described above, the illumination light may leak from the zoom lens barrel 5 through the respective intersections between the guide grooves 51d, 51e and the cam grooves 52a, 52b. Although black ink coatings are applied to the cut-off surfaces 211a and 212a (see FIG. 7), the illumination light will be stray light to the close-up optical system 210 if no impediments are located between the close-up optical system 210 and the illuminating optical system 300.

To prevent such a light leakage, a light shielding sheet 60 is adhered to the substantially overall region of the outer surface of the cam ring 52 except for the cam gear 56. The light shielding sheet 60 is an anti-reflection material, which is a black PET (polyethylene terephthalate) sheet having a thickness of about 50 μm with a minute uniform resin (satin coating) coated on the surface thereof. As the light shielding sheet 60, "SOMABLACK NR" (trade name) manufactured by Somar Corporation can be used, for example. The light shielding sheet 60 is affixed to the outer surface of the cam ring 52 with an acrylic adhesion layer coated on the back surface of the sheet.

The cam gear 56 fixed to the upper end of the cam ring 52 is engaged with the ring gear 4b of the zoom lens barrel 4 of one zoom optical system 220 shown in FIG. 10. Accordingly, when the zoom lens barrels 4 of the respective zoom optical systems 220, 230 are rotated by the motor 2 to zoom the zoom optical systems 220, 230, the cam ring 52 of the zoom lens barrel 5 is rotated. As a result, the moving lens frames 53, 54 are driven in the axial direction, which changes the focal length of the illuminating lens 310, varying degree of divergence of the illumination light.

Since the illumination light passing through the interior of the zoom lens barrel 5 is shielded by the light shielding sheet 60, the illuminating light will not enter the interior of the close-up optical system 210 as stray light. Furthermore, the anti-reflection coating applied on the light shielding sheet 60 prevents the light from the close-up optical system 210 from reflection back to the close-up optical system 210 as stray light.

Three concrete examples of the illuminating optical system 300 will be described hereinafter.

FIRST EXAMPLE

Figure 15:
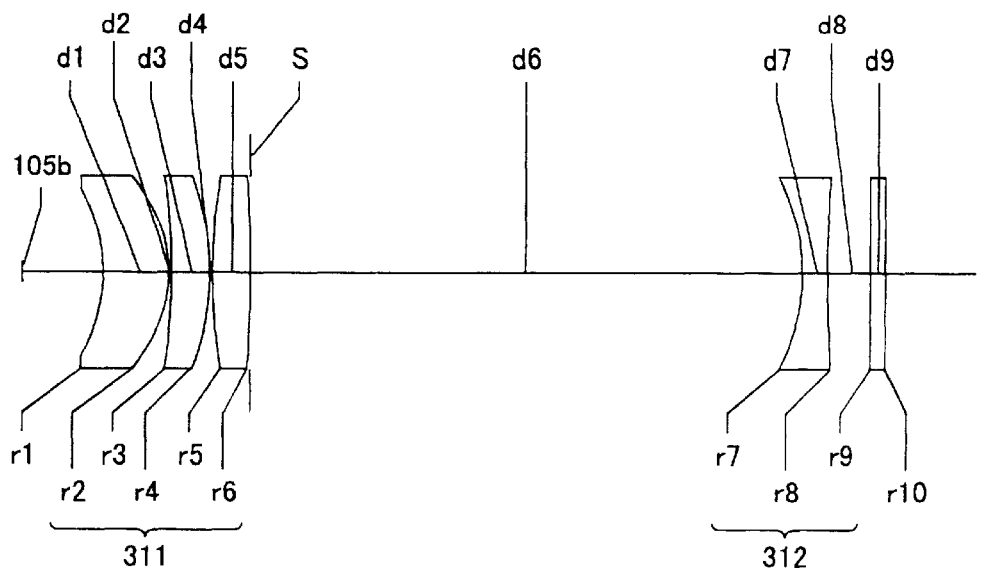
FIG. 15 is a lens diagram of the illuminating optical system at the shortest focal length according to a first example.
Figure 16:
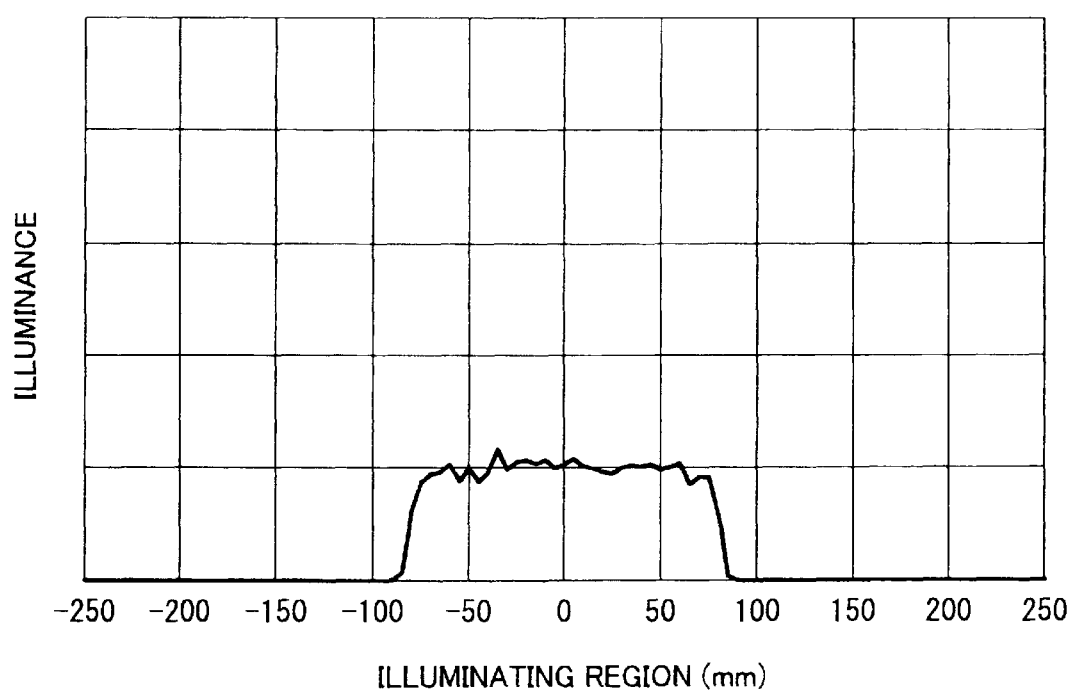
FIG. 16 is a graph showing simulated illuminance distribution on the object when the illuminating lens of the first example is used at the shortest focal length.
Figure 17:
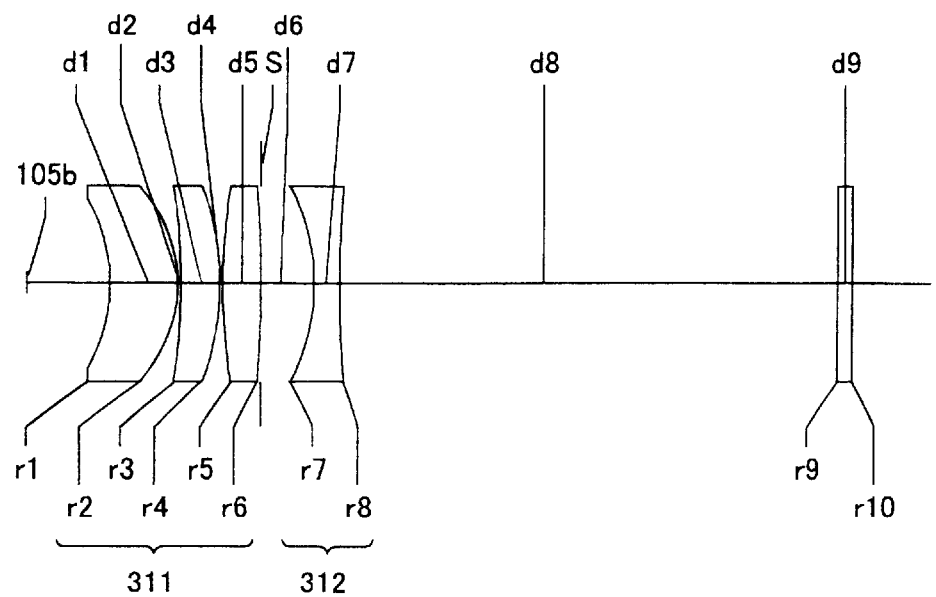
FIG. 17 is a lens diagram of the illuminating optical system at the longest focal length according to a first example.
Figure 18:
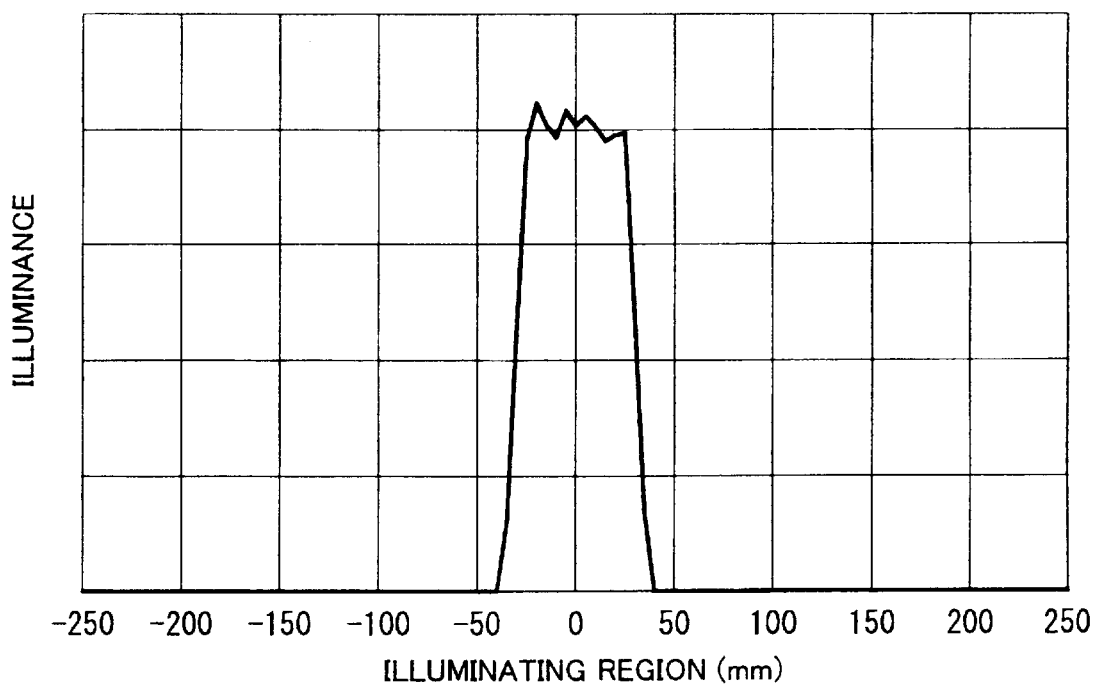
FIG. 18 is a graph showing simulated illuminance distribution on the object when the illuminating lens of the first example is used at the longest focal length.

FIG. 15 shows the illuminating optical system 300 of the first example at the shortest focal length, and FIG. 16 is a graph showing simulated illuminance distribution on the object at a distance 400 mm from the exit surface of the prism 320 when the illuminating optical system of the first example is used at the longest focal length. Further, FIG. 17 shows is the illuminating optical system 300 of the first example at the longest focal length, and FIG. 18 is a graph showing the similar simulated illuminance distribution when the illuminating optical system of the first example is used at the shortest focal length.

The illuminating lens 310 of the first example consists of the first lens group 311 including three positive lenses, an aperture stop S, and the second lens group 312 that only includes a single negative lens, arranged in that order from the exit surface 105b of the light guide fiber bundle 105. The first lens group 311 includes a positive meniscus first lens, a positive meniscus second lens and a biconvex third lens. The negative lens of the second lens group 312 is a biconcave fourth lens.

The first and second lens groups 311 and 312 are movable along the optical axis direction to change the divergent degree of the illumination light. Since the positive refractive power of the first lens group 311 is distributed among the three lenses, the spherical aberration can be reduced, keeping uniformity of the illuminance distribution with the small F-number.

The numerical construction of the illuminating lens of the first example is described in TABLE 1. In TABLE 1, r(unit:mm) denotes a radius of curvature of a surface, d (unit: mm) denotes a distance between the surfaces along the optical axis, $n_e$ denotes a refractive index at a wavelength 546 nm and $v_e$ denotes an Abbe's number of which center wavelength is 546 nm.

The surface number 0 represents the exit surface 105b, the surface numbers 1 through 6 represent the first lens group 311, S represents the aperture stop, the surface numbers 7 and 8 represent the second lens group 312 and the surface numbers 9 and 10 represent the wedge prism 320.

The values that vary with respect to the zooming are shown in TABLE 2. In TABLE 2, f denotes a focal length (unit: mm), Fno denotes F-number, d0 denotes a distance between the exit surface 105b of the light guide fiber bundle 105 and the first surface (surface No. 1), ds denotes a distance between the aperature stop S and the seventh surface (surface No. 7) and d8 denotes a distance between the eighth surface (surface No. 8) the ninth surface (surface No. 9).

TABLE 1

| Surface Number | r | d | $n_e$ | $v_e$ |
|---|---|---|---|---|
| 0 | ∞ | variable | | |
| 1 | −21.599 | 8.720 | 1.77621 | 49.3 |
| 2 | −18.000 | 0.200 | | |
| 3 | −79.392 | 5.190 | 1.77621 | 49.3 |
| 4 | −33.000 | 0.200 | | |
| 5 | 91.368 | 4.390 | 1.77621 | 49.3 |
| 6 | −116.725 | 0.200 | | |
| S | ∞ | variable | | |
| 7 | −32.300 | 3.430 | 1.51825 | 63.9 |
| 8 | 189.000 | variable | | |
| 9 | ∞ | 2.000 | 1.51825 | 63.9 |
| 10 | ∞ | 400.000 | | |

TABLE 2

| f | 11.0 | 30.0 |
|---|---|---|
| Fno | 1.1 | 1.4 |
| d0 | 15.720 | 23.277 |
| ds | 70.813 | 6.128 |
| d8 | 5.288 | 62.415 |

In the first example, when the focal length f has the shortest value 11.0 mm, the distance between the first and second lens groups 311, 312 is maximized as shown in FIG. 15, the divergent rays exited from one point on the exit surface 105b are converted into parallel rays through the illuminating lens 310. Therefore, the divergent rays exited from the most outer portion of the exit surface 105b are converted into parallel rays that have the maximum angle with respect to the optical axis Ax4 of the illuminating lens 310, and that angle equals the maximum spread angle of the entire illumination light beam. When the diameter of the light guide fiber bundle 105 is 4 mm, the maximum spread angle becomes 10.5 degrees, the diameter of the illuminating region is 165 mm on the object at a distance 400 mm from the exit surface of the prism 320 (see FIG. 16). The illuminating region is defined as a region in which the illuminance exceeds a half of the peak illuminance.

On the other hand, when the focal length f has the longest value 30.0 mm, the distance between the first and second lens groups 311, 312 is minimized as shown in FIG. 17, the maximum spread angle becomes 3.9 degrees, the diameter of the illuminating region is 60 mm on the object at a distance 400 mm from the exit surface of the prism 320 (see FIG. 18).

SECOND EXAMPLE

Figure 19:
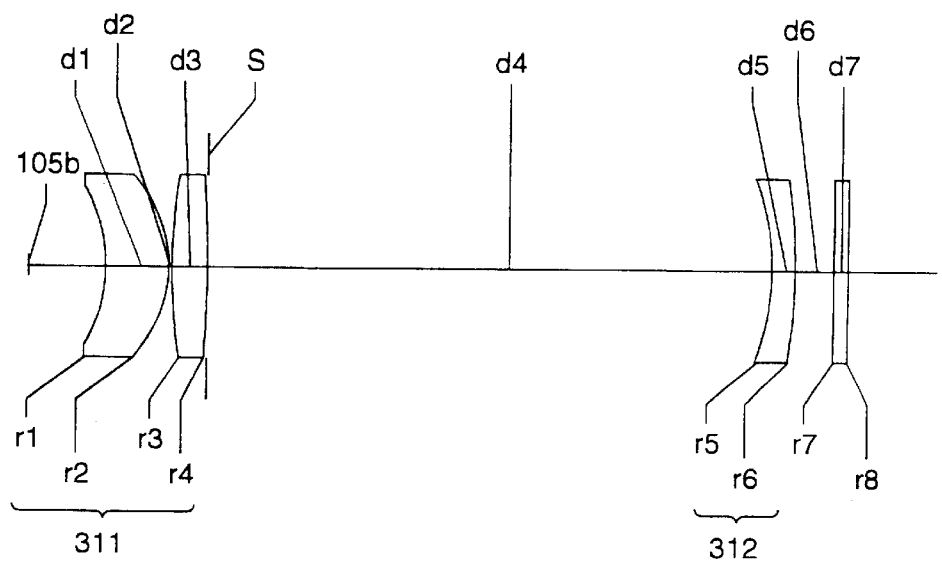
FIG. 19 is a lens diagram of the illuminating optical system at the shortest focal length according to a second example.
Figure 20:
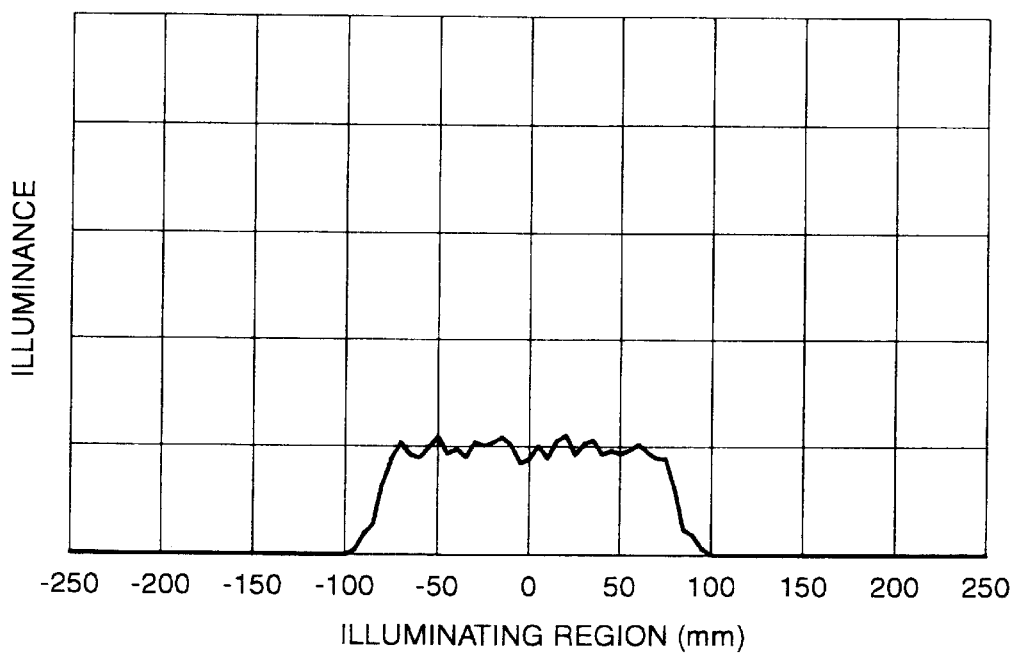
FIG. 20 is a graph showing simulated illuminance distribution on the object when the illuminating lens of the second example is used at the shortest focal length.
Figure 21:
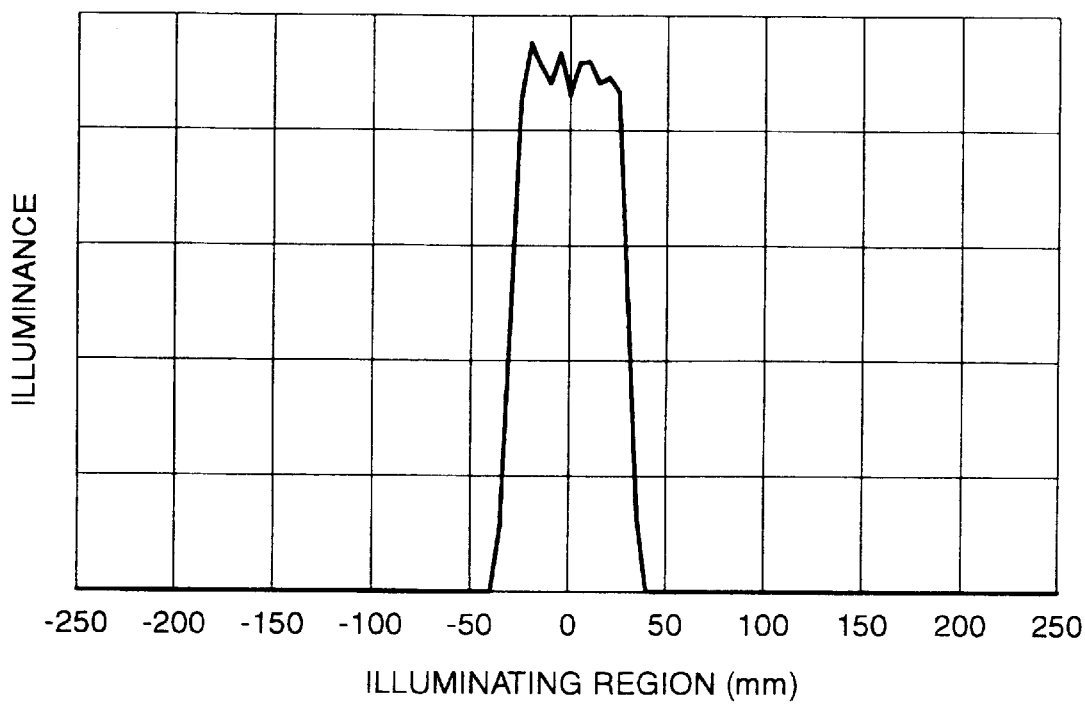
FIG. 21 is a graph showing simulated illuminance distribution on the object when the illuminating lens of the second example is used at the longest focal length.

FIG. 19 shows the illuminating optical system 300 of the second example at the shortest focal length, and FIG. 20 is a graph showing simulated illuminance distribution on the object at a distance 400 mm from the exit surface of the prism 320 when the illuminating optical system of the second example is used at the shortest focal length. Further, FIG. 21 is a graph showing the similar simulated illuminance distribution when the illuminating optical system 300 of the second example is used at the longest focal length.

The illuminating lens 310 of the second example consists of the first lens group 311 including two positive lenses, an aperture stop S, and the second lens group 312 that only includes a single negative lens, arranged in that order from the light incident side.

The numerical construction of the illuminating lens of the second example is described in TABLE 3. In TABLE 3, the surface number 0 represents the exit surface 105b, the surface numbers 1 through 4 represent the first lens group 311, S represents the aperture stop, the surface numbers 5 and 6 represent the second lens group 312 and the surface numbers 7 and 8 represent the wedge prism 320. The values that vary with respect to the zooming are shown in TABLE 4.

TABLE 3

| Surface Number | r | d | $n_e$ | $v_e$ |
|---|---|---|---|---|
| 0 | ∞ | variable | | |
| 1 | −26.383 | 8.720 | 1.88814 | 40.5 |
| 2 | −18.289 | 0.200 | | |
| 3 | 120.279 | 4.470 | 1.88814 | 40.5 |
| 4 | −55.132 | 0.200 | | |
| S | ∞ | variable | | |
| 5 | −26.875 | 3.000 | 1.69979 | 55.3 |
| 6 | −81.509 | variable | | |
| 7 | ∞ | 2.000 | 1.51825 | 63.9 |
| 8 | ∞ | 400.000 | | |

TABLE 4

| f | 11.0 | 30.0 |
|---|---|---|
| Fno | 1.1 | 1.3 |
| d0 | 17.152 | 23.876 |
| ds | 75.765 | 5.150 |
| d6 | 5.000 | 68.891 |

In the second example, when the focal length f has the shortest value 11.0 mm, the illuminating region is maximized, and when the focal length f has the longest value 30.0 mm, the illuminating region is minimized. The maximum and minimum diameters of the illuminating region are the same as the first example (see FIGS. 20 and 21).

THIRD EXAMPLE

Figure 22:
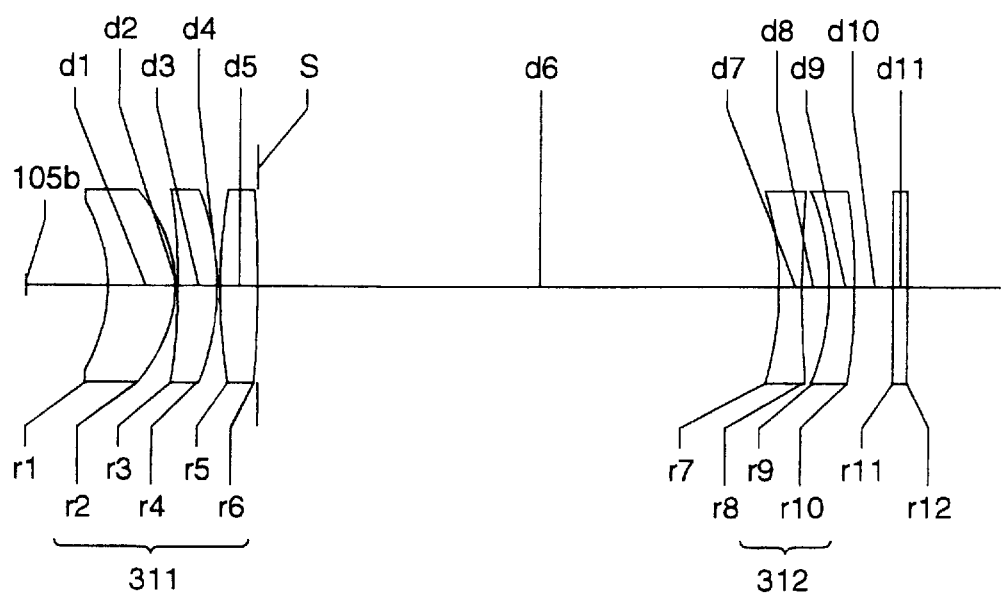
FIG. 22 is a lens diagram of the illuminating optical system at the shortest focal length according to a third example.
Figure 23:
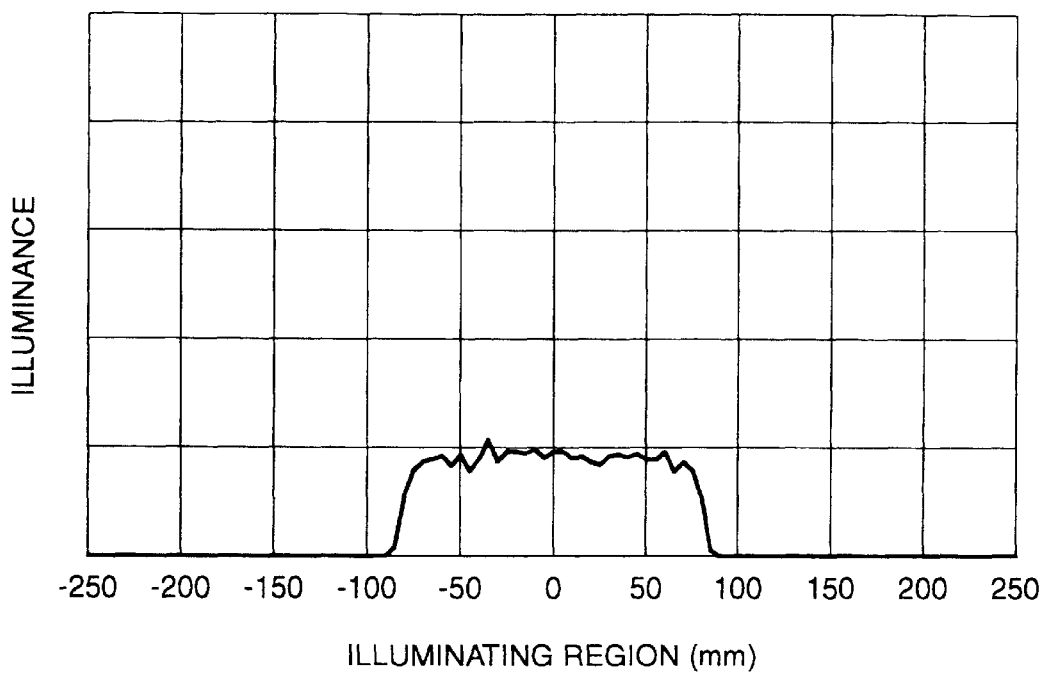
FIG. 23 is a graph showing simulated illuminance distribution on the object when the illuminating lens of the third example is used at the shortest focal length.
Figure 24:
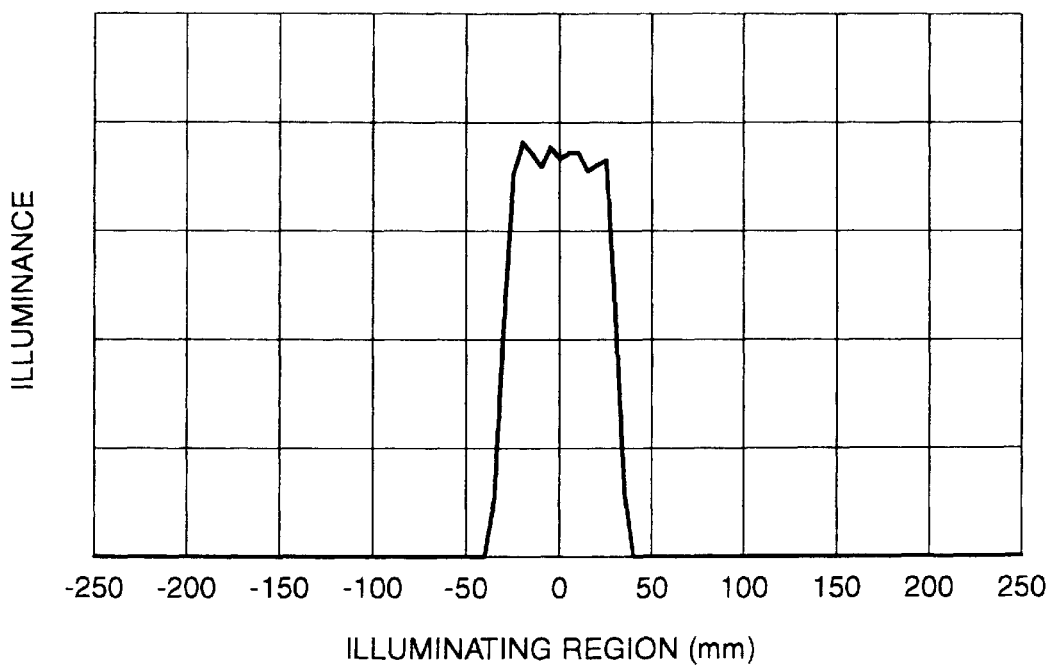
FIG. 24 is a graph showing simulated illuminance distribution on the object when the illuminating lens of the third example is used at the longest focal length.

FIG. 22 shows the illuminating optical system 300 of the third example at the shortest focal length, and FIG. 23 is a graph showing simulated illuminance distribution on the object at a distance 400 mm from the exit surface of the prism 320 when the illuminating optical system of the second example is used at the shortest focal length. Further, FIG. 24 is a graph showing the similar simulated illuminance distribution when the illuminating optical system 300 of the third example is used at the longest focal length.

The illuminating lens 310 of the third example consists of the first lens group 311 including three positive lenses, an aperture stop S, and the second lens group 312 including two negative lenses, arranged in that order from the light incident side.

The numerical construction of the illuminating lens of the third example is described in TABLE 5. In TABLE 5, the surface number 0 represents the exit surface 105b, the surface numbers 1 through 6 represent the first lens group 311, S represents the aperture stop, the surface numbers 7 through 10 represent the second lens group 312 and the surface numbers 11 and 12 represent the wedge prism 320. The values that vary with respect to the zooming are shown in TABLE 6.

TABLE 5

| Surface Number | r | d | $n_e$ | $v_e$ |
|---|---|---|---|---|
| 0 | ∞ | variable | | |
| 1 | −19.483 | 8.720 | 1.77621 | 49.3 |
| 2 | −17.476 | 0.200 | | |
| 3 | −90.440 | 4.460 | 1.77621 | 49.3 |
| 4 | −33.210 | 0.200 | | |
| 5 | 86.538 | 3.930 | 1.77621 | 49.3 |
| 6 | −120.704 | 0.000 | | |
| S | ∞ | variable | | |
| 7 | −56.458 | 3.000 | 1.51825 | 63.9 |
| 8 | ∞ | 3.130 | | |
| 9 | −28.085 | 3.000 | 1.51825 | 63.9 |
| 10 | −63.352 | variable | | |
| 11 | ∞ | 2.000 | 1.51825 | 63.9 |
| 12 | ∞ | 400.000 | | |

TABLE 6

| f | 11.0 | 30.0 |
|---|---|---|
| Fno | 1.1 | 1.4 |
| d0 | 15.671 | 23.344 |
| ds | 66.860 | 5.079 |
| d10 | 5.000 | 59.108 |

In the third example, when the focal length f has the shortest value 11.0 mm, the illuminating region is maximized, and when the focal length f has the longest value 30.0 mm, the illuminating region is minimized. The maximum and minimum diameters of the illuminating region are the same as the first example (see FIGS. 23 and 24).

The present disclosure relates to the subject matters contained in Japanese Patent Applications Nos. HEI 11-150836 filed on May 31, 1999 and HEI 11-294347 filed on Oct. 15, 1999, which are expressly incorporated herein by reference in their entireties.

What is claimed is:

1. A microscope comprising:
 a close-up optical system that faces an object, one side of each lens included in said close-up optical system being cut out;
 at least one imaging optical system that takes object light rays passing through a region of said close-up optical system, said region being offset from the optical axis of the close-up optical system in the direction opposite to the cutout side;
 an illuminating optical system that guides illumination light emitted from a light source to illuminate said object;
 a first lens barrel that supports said close-up optical system;
 a second lens barrel that supports said illuminating optical system, said second lens barrel being arranged in the cutout space of said close-up optical system inside said first lens barrel; and
 a light shielding member attached to said second lens barrel to prevent a leak of the illumination light through grooves formed on said second lens barrel.

2. The microscope according to claim 1, comprising a pair of said imaging optical systems for enabling stereoscopic observation.

3. The microscope according to claim 1, wherein said illuminating optical system comprises an illuminating lens that includes a plurality of lens groups, said lens groups being movable along the optical axis direction to change focal length of said illuminating lens.

4. The microscope according to claim 3, wherein said first lens barrel comprises:
 a fixed ring that is fixed to a housing of the microscope, a plurality of guide grooves being formed on the circumference of said fixed ring;
 a cam ring that is rotatably connected around said fixed ring, a plurality of cam grooves are formed on the circumference of said cam ring such that the cam grooves intersect obliquely with said guide grooves, respectively; and
 a plurality of moving lens frames that are inserted in said fixed ring with holding said lens groups, respectively, wherein at least one drive pin is installed on each of said moving lens frame to penetrate the intersection between said guide groove and said cam groove.

5. The microscope according to claim 4, wherein said light shielding member is attached to the outer surface of said cam ring.

6. The microscope according to claim 5, wherein said light shielding member is coated with anti-reflection material.

7. The microscope according to claim 3, wherein said illuminating lens comprises:
 a first lens group of a positive refractive power, all of the lenses included in first said lens group being positive lenses; and
 a second lens group of a negative refractive power that is located at an object side with respect to said first lens group, all of lenses included in said second lens group being negative lenses.

8. The microscope according to claim 7, wherein said first lens group of said illuminating lens includes at least two positive lenses.

9. The microscope according to claim 8, wherein said first lens group of said illuminating lens consists of three positive lenses.

10. The microscope according to claim 7, wherein said second lens group of said illuminating lens consists of a single negative lens.

* * * * *